US012457467B2

(12) United States Patent
Feng et al.

(10) Patent No.: US 12,457,467 B2
(45) Date of Patent: Oct. 28, 2025

(54) ACTIVE NOISE CANCELLATION SYSTEM AND METHOD

(71) Applicant: Harman International Industries, Incorporated, Stamford, CT (US)

(72) Inventors: Tao Feng, Novi, MI (US); Geon-Seok Kim, Novi, MI (US); Sihui Wu, Irvine, CA (US); Shengwei Bai, Suzhou (CN); Michael Hinz, Vancouver (CA); Rajeshkumar Venugopal, Waterford, MI (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 273 days.

(21) Appl. No.: 18/305,150

(22) Filed: Apr. 21, 2023

(65) Prior Publication Data

US 2024/0357305 A1 Oct. 24, 2024

(51) Int. Cl.
*H04R 5/02* (2006.01)
*H04S 7/00* (2006.01)

(52) U.S. Cl.
CPC .......... *H04S 7/302* (2013.01); *H04S 2420/01* (2013.01)

(58) Field of Classification Search
CPC ............................ H04S 7/302; H04S 2420/01
USPC .......................................... 381/300, 86, 302
See application file for complete search history.

(56) References Cited

U.S. PATENT DOCUMENTS

2023/0085506 A1* 3/2023 Bastyr .............. G10K 11/17883
381/86

FOREIGN PATENT DOCUMENTS

| | | | |
|---|---|---|---|
| EP | 3996086 | A1 | 5/2022 |
| EP | 4148725 | A1 | 3/2023 |
| WO | 2022031279 | A1 | 2/2022 |

OTHER PUBLICATIONS

European Patent Office, Extended European Search Report Issued in Application No. 24168983.5, Aug. 9, 2024, Germany, 7 pages.

* cited by examiner

*Primary Examiner* — Ammar T Hamid
(74) *Attorney, Agent, or Firm* — McCoy Russell LLP

(57) ABSTRACT

Methods and systems are disclosed for an audio system for a vehicle system. In one example, a noise cancellation system includes a vehicle having a plurality of speakers and a plurality of microphones, a plurality of sensors, and a controller. The controller includes instructions stored on non-transitory memory that when executed cause the controller to generate a noise cancellation signal using a set of head-related impulse responses for the plurality of speakers and the plurality of microphones based on a head position of one or more occupants and a plurality of transfer functions, including to selectively update only a subset of the plurality of transfer functions responsive to the plurality of sensors detecting head movement greater than a threshold.

20 Claims, 11 Drawing Sheets

ACTIVE NOISE CANCELLATION SYSTEM AND METHOD

FIELD

The disclosure relates to an active noise cancellation system and a method for controlling an active noise cancellation system.

BACKGROUND

Active noise control is used to generate sound waves that destructively interfere with undesired sound waves. The destructively interfering sound waves may be produced by a transducer, such as a loudspeaker, to combine with the undesired sound waves. Cancelling or reducing unwanted noise in this manner is sometimes referred to as active noise cancellation, noise control, or destructive interference.

In many examples, active noise cancellation (ANC) systems rely on sensors for detecting noise and/or signals representing noise, such as, for example, microphones and/or non-acoustic sensors, filters for signal processing, and speakers or other acoustic actuators for generating a compensatory sound field or anti-noise based on the filtered noise signal. The compensatory sound field or anti-noise played via the speakers reduces or eliminates the detected noise signal. Residual noise may be measured using error microphones to estimate an error signal and the filters may be updated based on the error signal.

Currently, the operating frequency range of traditional vehicle ANC systems is 20 to 400 Hz and it is difficult to control noise above 400 Hz. As the frequency of noise increases, the wavelength decreases, which hinders generation of precise anti-noise signals in ANC systems. For example, high frequency active noise cancellation (HF-ANC) systems are more sensitive to occupant ear location compared with traditional ANC systems. As such, HF-ANC systems rely on accurate head-related impulse response (IR) filtering including, in some examples, measuring and storing sets of head-related impulse responses (also called head-related transfer functions) corresponding to a variety of head positions for each occupant of the vehicle. When the system detects head movement of one or more occupants, the HF-ANC system synchronously updates the set for the occupants from an initial position to a new position to maintain HF-ANC system performance.

However, the inventors herein have recognized potential issues with such systems. As a first example, head-related impulse responses have a position dependent characteristic referred to as a coupling effect. With the coupling effect, a head position of a first occupant (e.g., a driver) is coupled to head position of a second occupant (e.g., a passenger) such that the head movement of the first occupant and a stationary head position of the second occupant is a head-related IR set and vice versa. The coupling effect increases the head-related IR sets, including measuring, calculating, and storing all possible head position combinations of the occupants.

As a second example, a movement condition of one or more occupants demands replacing the current head-related IR set with a new set corresponding to the new position of the occupants. The number of head-related impulse responses in a set depends on the configuration of speakers and microphones in the vehicle audio system, and as such, each IR set may include many measurements. As each possible head position combination may be an IR set, a large memory is needed to store, retrieve, and update IR sets in an HF-ANC system. These computational and memory limitations make implementing HF-ANC in a vehicle system very challenging.

SUMMARY

Embodiments are disclosed for an active noise cancellation system for a vehicle system and a method for controlling an active noise cancellation system. In one example, a noise cancellation system includes a vehicle having a plurality of speakers and a plurality of microphones, a plurality of sensors, and a controller. The controller includes instructions stored on non-transitory memory that when executed cause the controller to generate a noise cancellation signal using a set of head-related impulse responses for the plurality of speakers and the plurality of microphones based on a head position of one or more occupants and a plurality of transfer functions, including to selectively update only a subset of the plurality of transfer functions responsive to the plurality of sensors detecting head movement greater than a threshold. In one example, the subset is substantially less than a total set of head-related impulse responses for the plurality of speakers and the plurality of microphones.

In one example, a method for a vehicle includes generating a noise cancellation signal using a set of head-related impulse responses for a plurality of speakers and a plurality of microphones based on a head position of one or more occupants, and selectively changing only a subset of transfer functions applied with the set of head-related impulse responses in response to the head position. The method may further include reducing high frequency noise in response to detected movement of one or more of occupants, and maintaining the rest of the head-related impulse responses.

In another example, a system includes a vehicle and one or more occupants positioned in the vehicle. The system includes a plurality of speakers comprising a left door speaker, a right door speaker, a driver headrest left speaker, a driver headrest right speaker, a passenger headrest left speaker, a passenger headrest right speaker, and a rear speaker positioned in the vehicle. The system includes a plurality of physical error microphones comprising a first dash microphone, a second dash microphone, a left door microphone, a right door microphone, a driver headrest left microphone, a driver headrest right microphone, a passenger headrest left microphone, and a passenger headrest right microphone positioned in the vehicle. The system includes a plurality of virtual error microphones comprising a driver left virtual microphone, a driver right virtual microphone, a passenger left virtual microphone, and a passenger right virtual microphone positioned in the vehicle. The system further includes a sensor detecting a head position of the one or more occupants of the vehicle and a stored database of head-related impulse responses. The system includes a controller in electronic communication with the sensor, the stored database, the plurality of speakers, the plurality of physical error microphones, and the plurality of virtual error microphones. The controller is programmed to execute a method, including generating a noise cancellation signal using head-related impulse response filtering. The method further includes, in response to detecting a first position of the one or more occupants, going to the stored database of the head-related impulse responses, selecting only a first subset of transfer functions comprising the head-related impulse response filtering, and updating only the first subset based on the first position. The method further includes, in response to detecting a second position of the one or more occupants, going to the stored database of head-related impulse responses, selecting only a second subset of transfer functions comprising the head-related impulse response filtering, and updating only the second subset based on the second position, wherein only the first subset is different from only the second subset.

In this way, high frequency and low frequency vehicle noise may be controlled with reduced computational complexity.

BRIEF DESCRIPTION OF THE DRAWINGS

The disclosure may be better understood from reading the following description of non-limiting embodiments, with reference to the attached drawings, wherein below.

DETAILED DESCRIPTION

In one of many exemplary embodiments, a high-frequency active noise cancellation (HF-ANC) system as described herein may reduce undesired sound present in an environment. Undesired sound is any sound that is annoying to a listener such as all kinds of noise including vehicle engine sound, road noise etc., but it can also be music or speech of others when, for example, the listener wants to make a telephone call. The disclosed system and methods avoid updating all head-related impulse responses (IR) in response to listener movement and instead updates only a subset of transfer functions that contribute to efficient and accurate performance of high frequency active noise cancelling with reduced computational complexity and memory demand.

Figure 1:
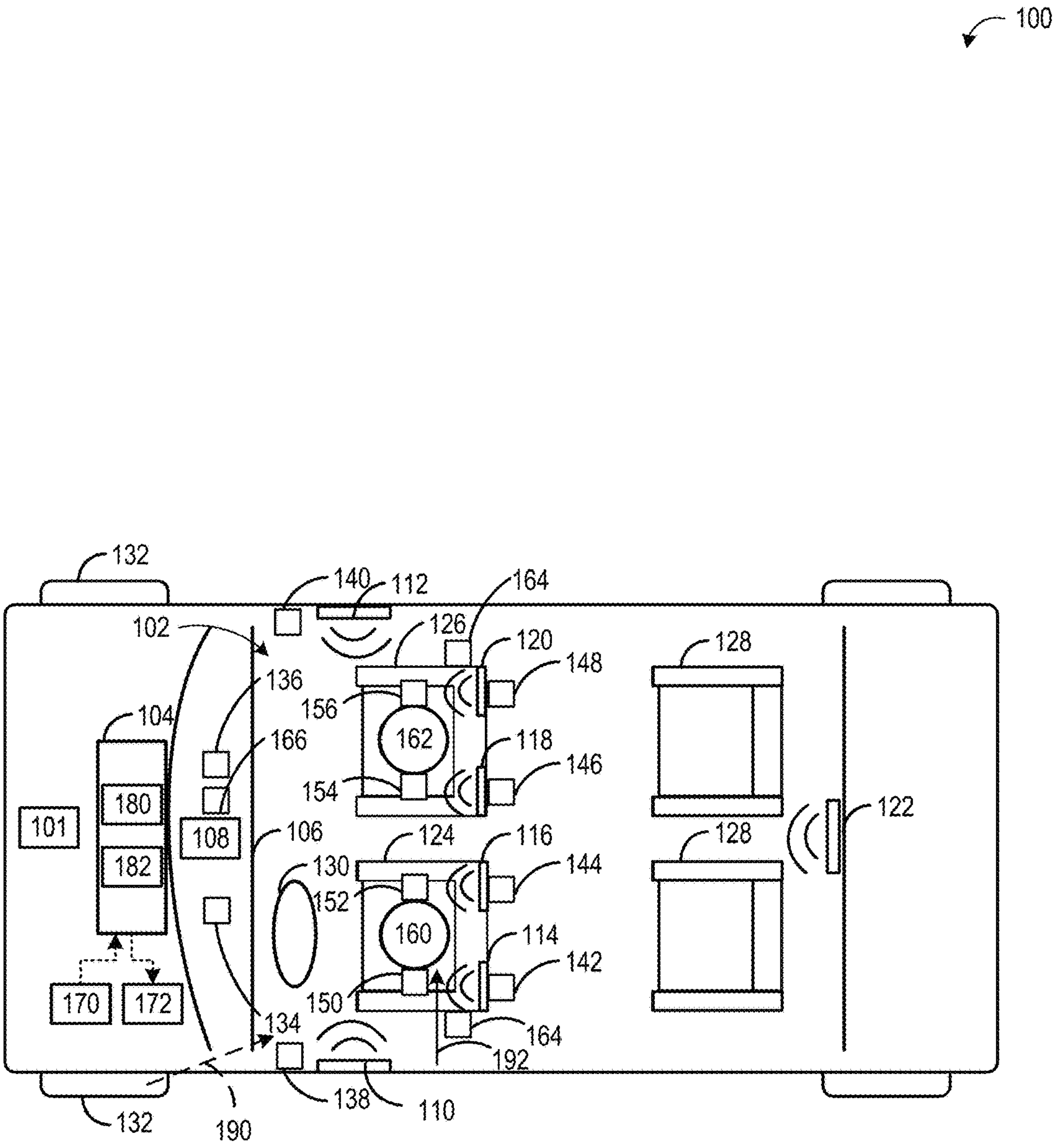
FIG. 1 shows a first example of an active noise cancellation system for a vehicle in accordance with one or more embodiments of the present disclosure.
Figure 2:
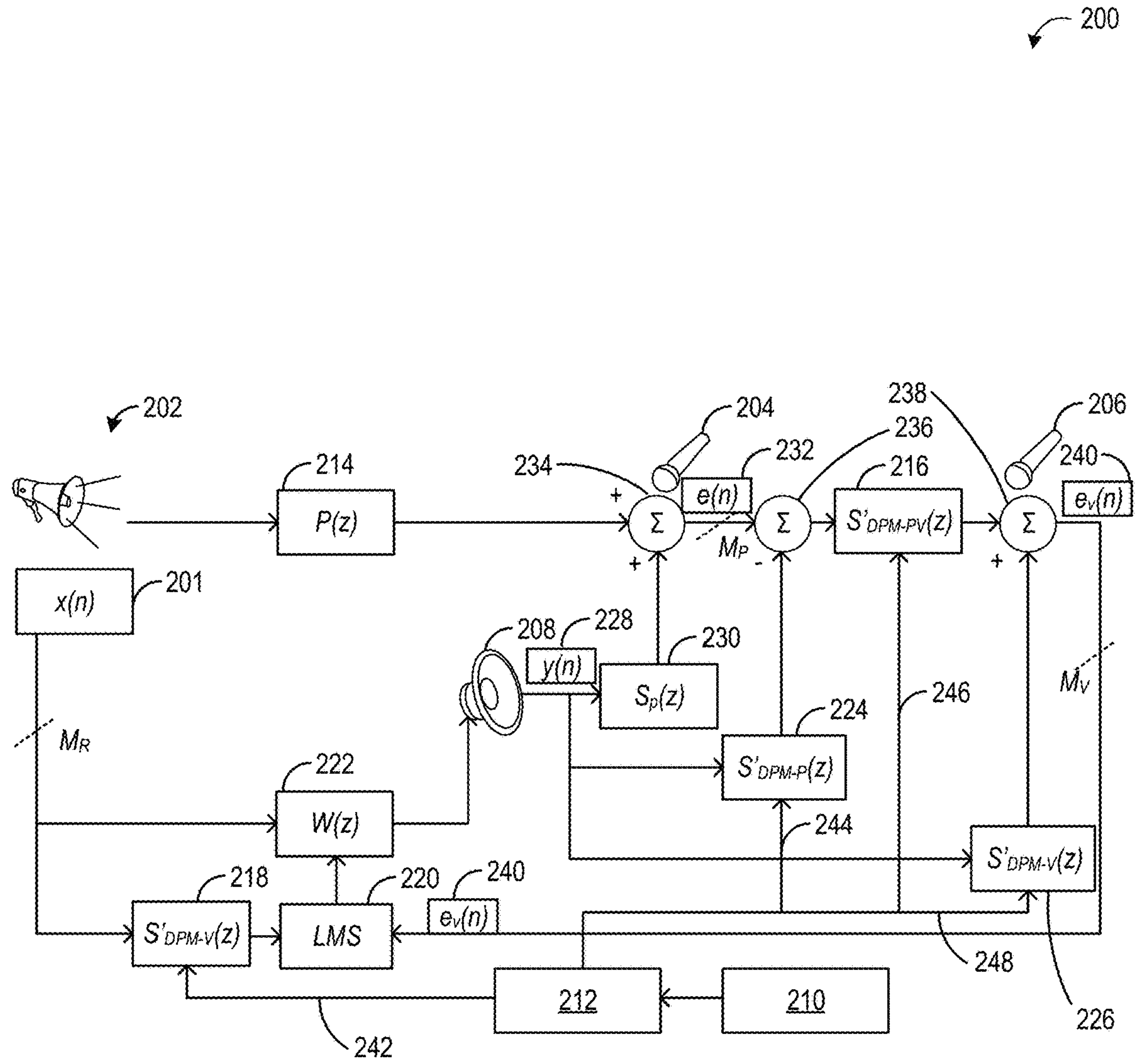
FIG. 2 shows a second example of an active noise cancellation system for a vehicle in accordance with one or more embodiments of the present disclosure.
Figure 3:
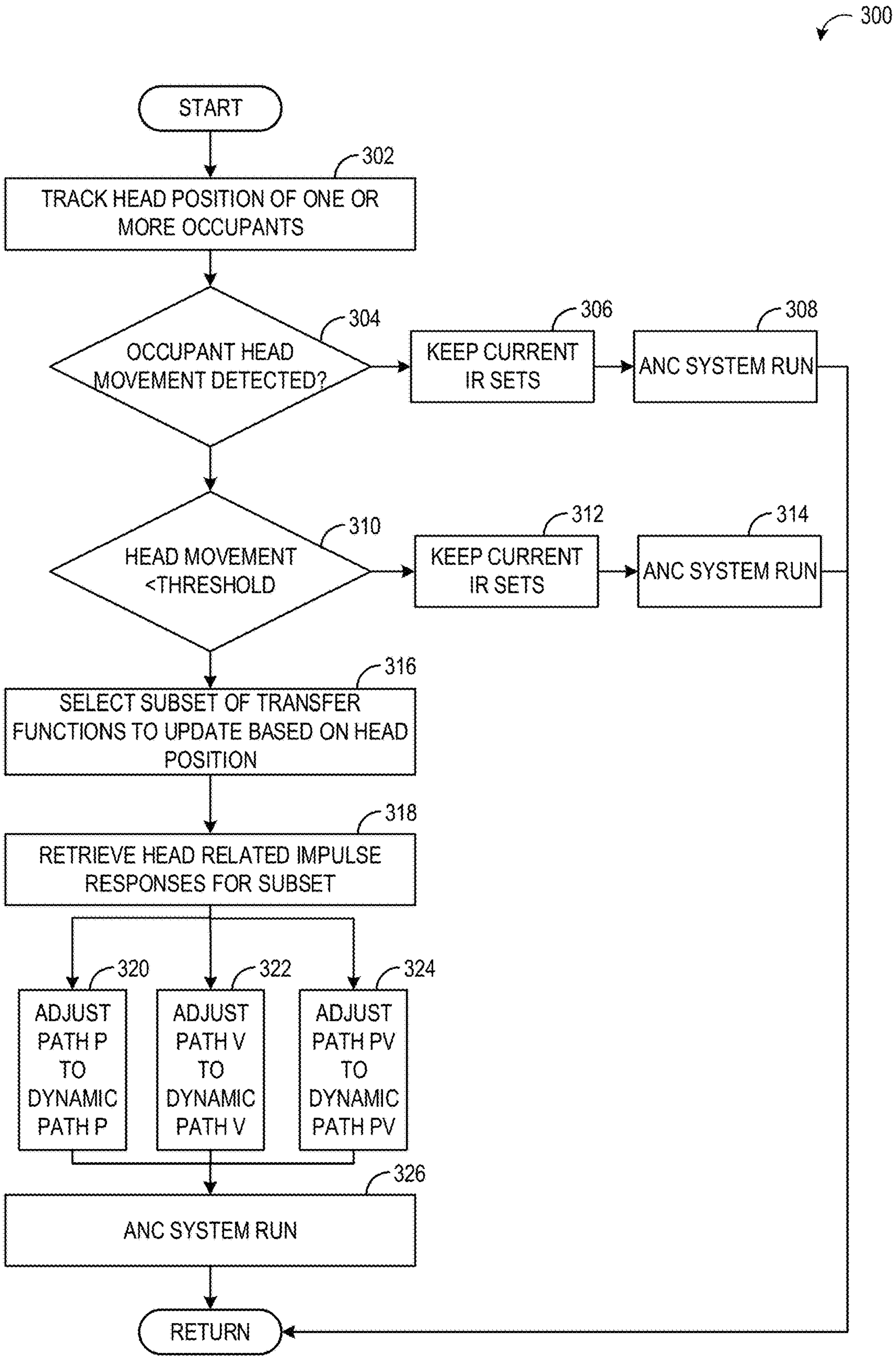
FIG. 3 shows a flow chart illustrating a method for controlling an active noise cancellation system in accordance with one or more embodiments of the present disclosure.
Figure 4:
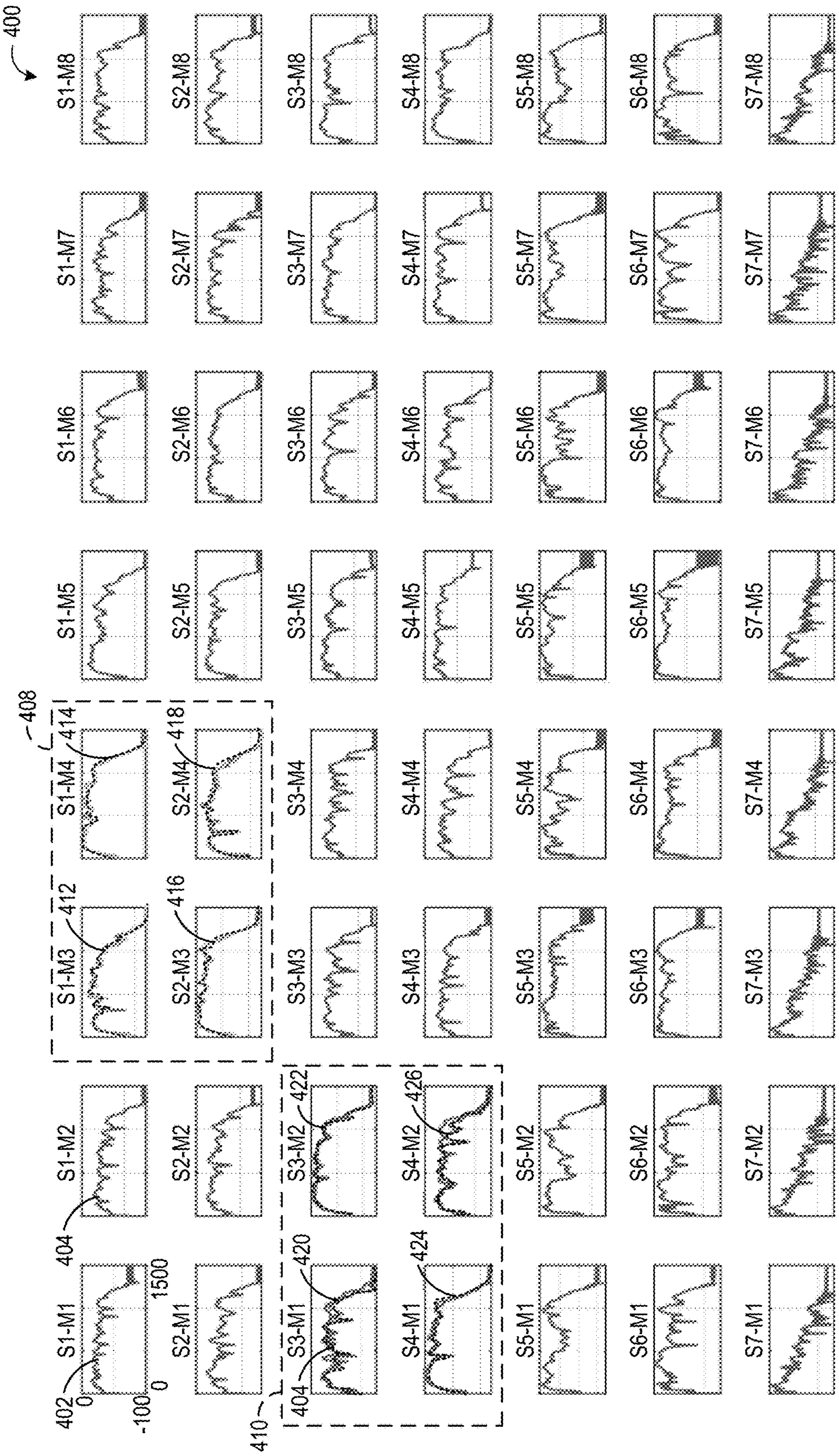
FIG. 4 shows a first example of frequency responses on a secondary path for an active noise cancellation system in accordance with one or more embodiments of the present disclosure.
Figure 5A:
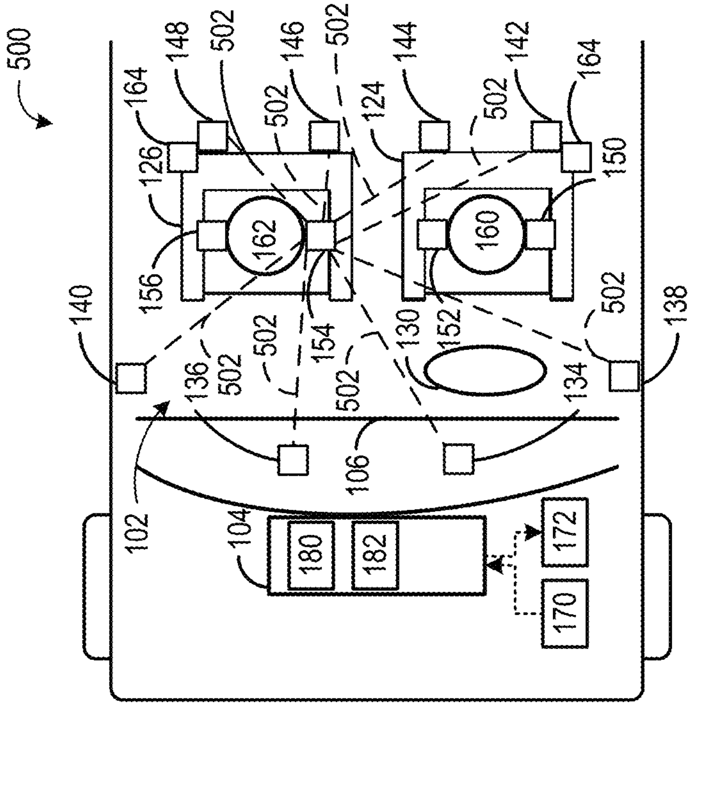
FIG. 5A (Prior Art)
FIG. 5A shows a diagram illustrating a first strategy for active noise cancellation in accordance with one or more embodiments of the present disclosure.
Figure 5B:
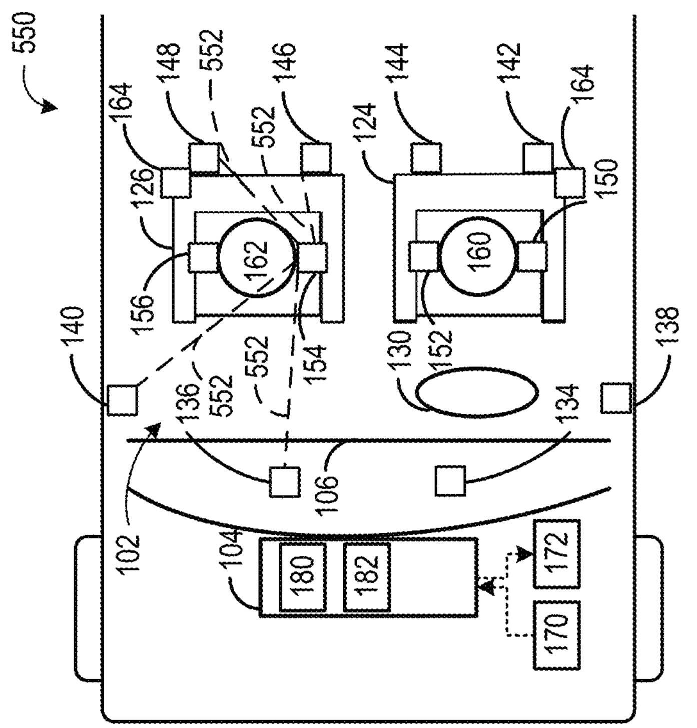
FIG. 5B shows a diagram illustrating a second strategy for active noise cancellation using a dynamic path management strategy in accordance with one or more embodiments of the present disclosure.
Figure 6:
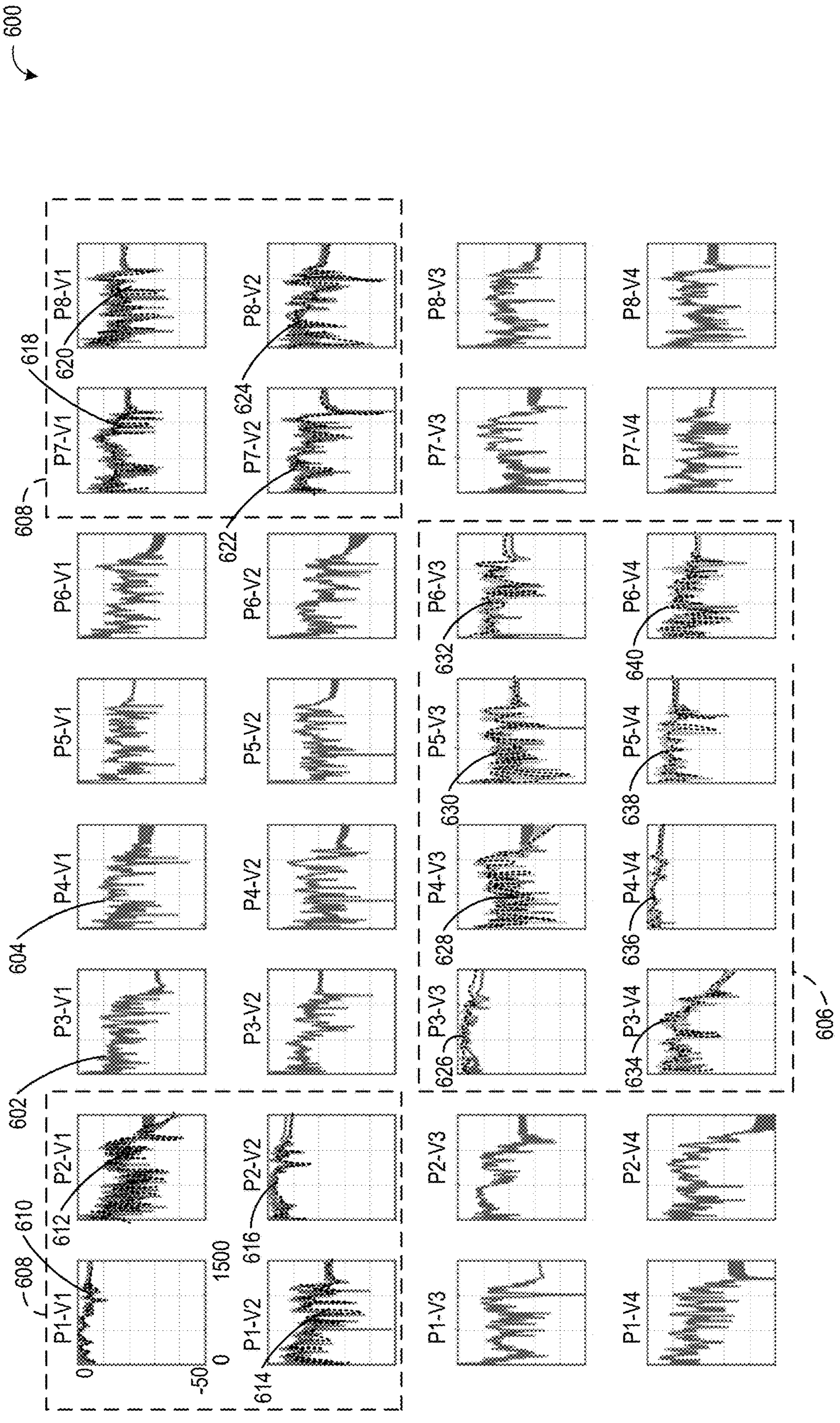
FIG. 6 shows an second example of frequency responses on a secondary path for an active noise cancellation system in accordance with one or more embodiments of the present disclosure.
Figure 7A:
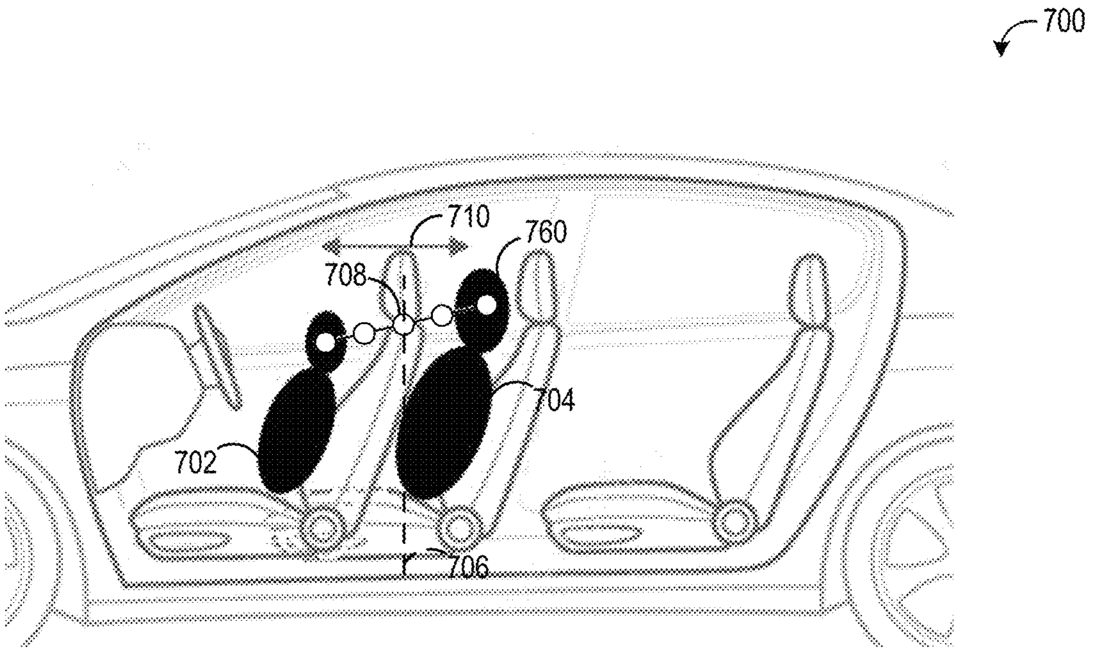
FIG. 7A is a diagram illustrating an example of broad band frequency responses in response to movement of a vehicle occupant in accordance with one or more embodiments of the present disclosure.
Figure 7B:
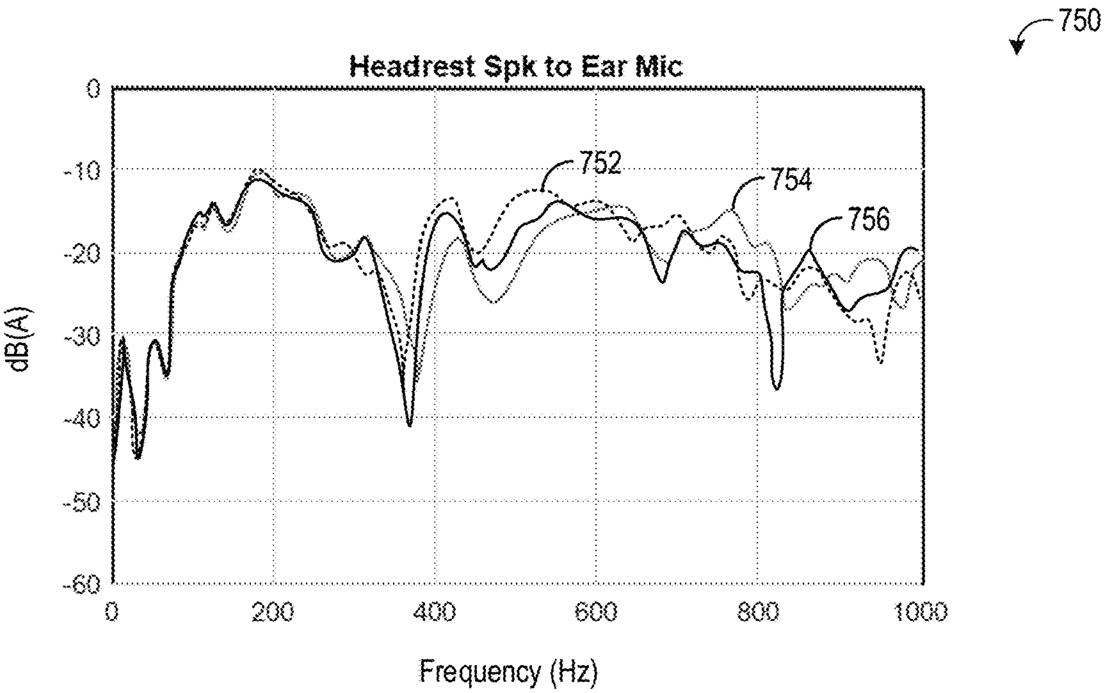
FIG. 7B is a plot illustrating an example of broad band frequency responses in response to movement of a vehicle occupant, such as shown in FIG. 7A in accordance with one or more embodiments of the present disclosure.
Figure 8:
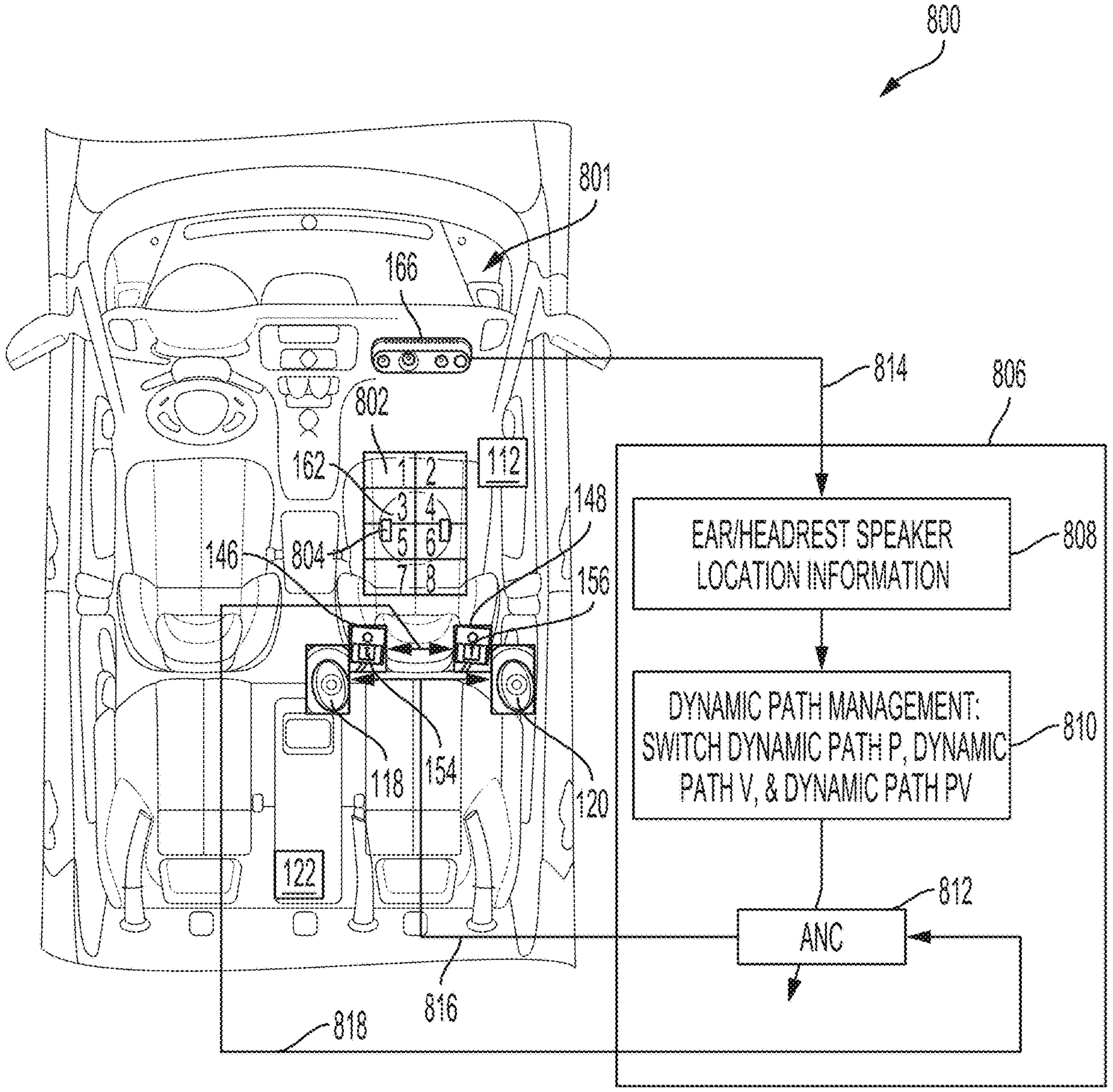
FIG. 8 shows an example strategy for controlling an HF-ANC system using dynamic path management based on an passenger position signal in accordance with one or more embodiments of the present disclosure.
Figure 9:
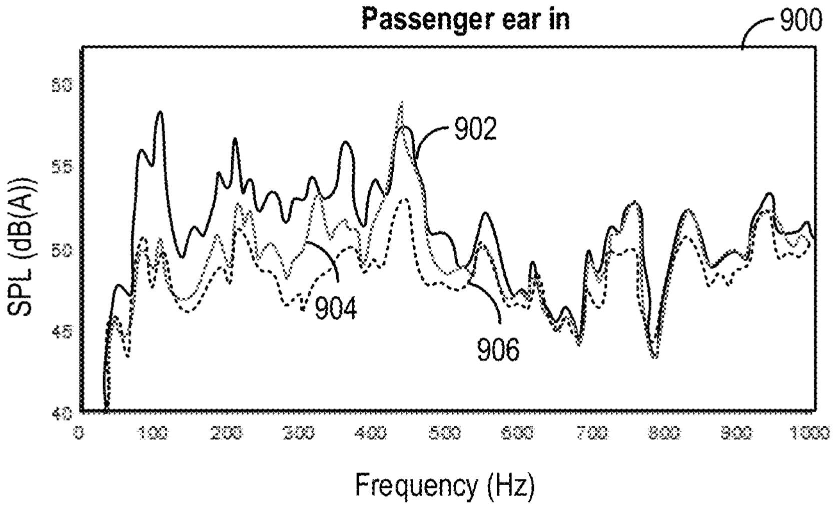
FIG. 9 shows a first comparison of simulation results for an HF-ANC system using the disclosed dynamic path management strategy and a more computationally demanding HF-ANC system in accordance with one or more embodiments of the present disclosure.
Figure 9:
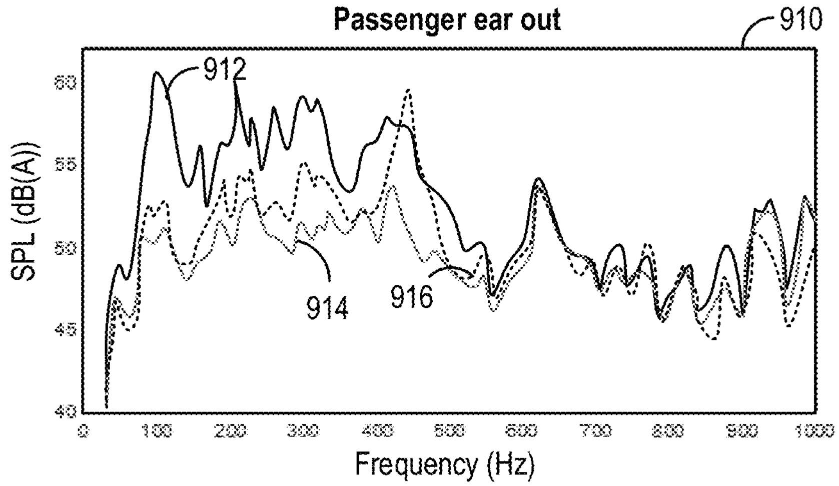
Figure 10:
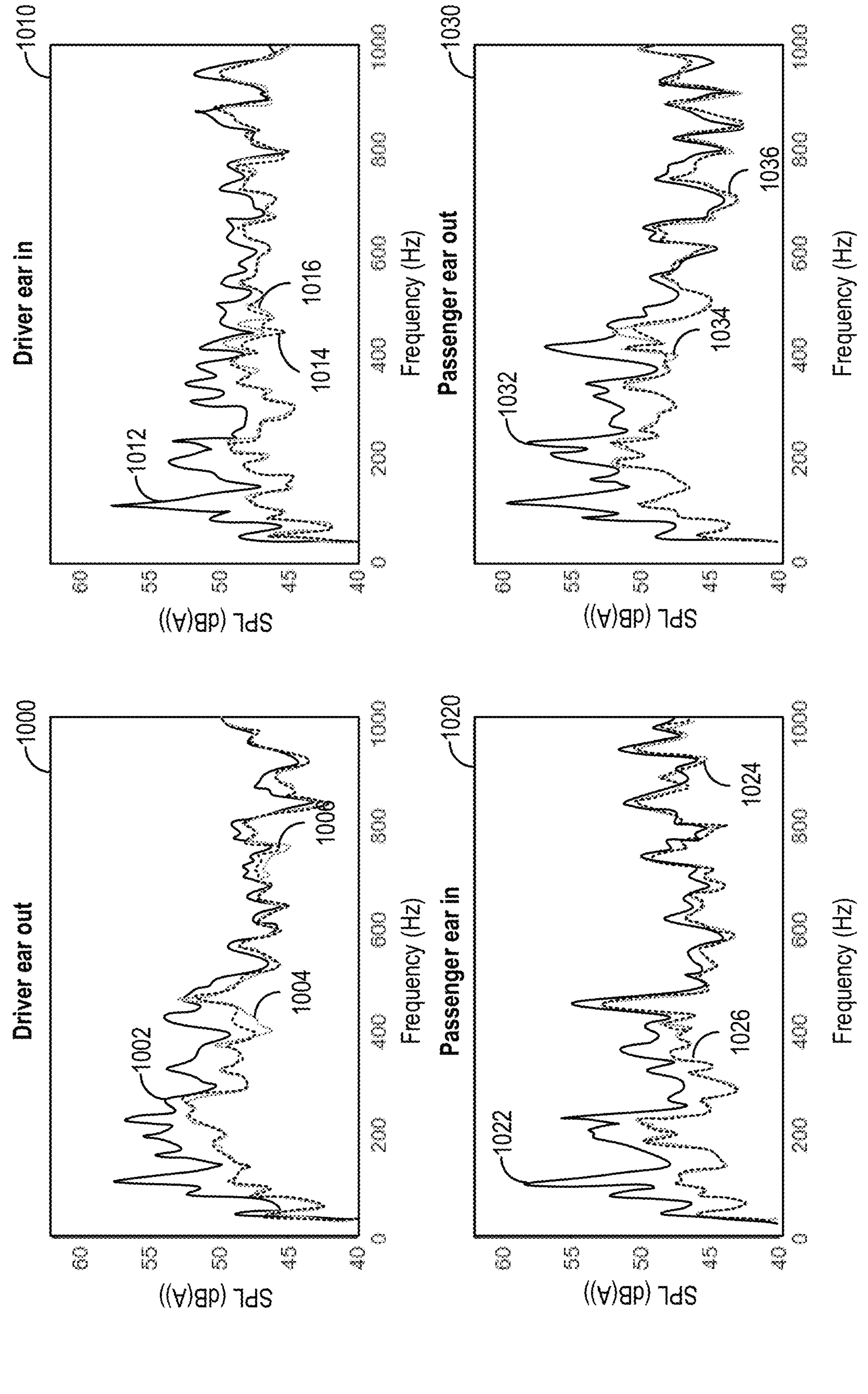
FIG. 10 shows a second comparison of simulation results for an HF-ANC system using the disclosed dynamic path management strategy and a more computationally demanding HF-ANC system in accordance with one or more embodiments of the present disclosure.
Figure 11:
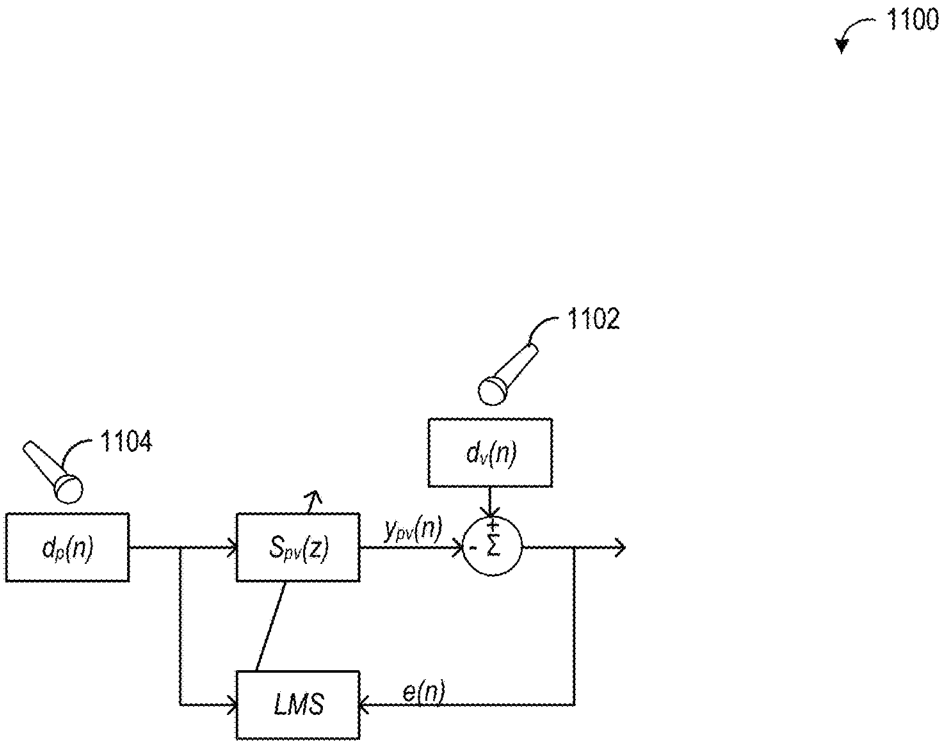
FIG. 11 shows a diagram of dynamic path PV calculations in accordance with one or more embodiments of the present disclosure.

FIG. 1 shows a first example of an HF-ANC system for a vehicle system. The HF-ANC system generates a compensation or anti-noise signal based on an undesired noise signal that reduces the undesired noise signal by destructive interference. The anti-noise signal is generated using head-related impulse response filtering based on a sensor signal indicating a head, ear, or seat position of one or more vehicle occupants. In one example, head-related impulse responses (IRs) for a plurality of speakers and error microphones positioned in the vehicle system are obtained for a plurality of possible vehicle occupant positions. The system tracks occupant position and updates signal-processing pathways based on the occupant position using an efficient dynamic path management strategy. A second example of an HF-ANC system for reducing vehicle interior noise using a dynamic path management strategy is shown in FIG. 2. When the HF-ANC system detects a position of one or more vehicle occupants has changed, the HF-ANC system updates only a subset of transfer functions based on the new position, while the rest of the transfer functions are maintained static. A flow chart illustrating an example method for HF-ANC using a dynamic path management strategy is shown in FIG. 3. A first set of frequency responses on a secondary path for an HF-ANC system for a vehicle is shown in FIG. 4. FIG. 5A shows a diagram illustrating a prior art method for HF-ANC. The prior art method is computationally demanding owing to a coupling issue that arises on a secondary path of the HF-ANC system. FIG. 5B shows a diagram illustrating a method for HF-ANC using a dynamic path management strategy that resolves the coupling issue on the secondary path. A second set of frequency responses on a secondary path for an HF-ANC system for a vehicle is shown in FIG. 6. FIG. 7A and FIG. 7B illustrate examples of broad band frequency responses in response to movement of a vehicle occupant such as a driver. FIG. 8 shows an example strategy for controlling an HF-ANC system using dynamic path management based on an occupant position signal. FIG. 9 and FIG. 10 show comparisons of simulation results for an HF-ANC system using the disclosed dynamic path management strategy and a more computationally demanding HF-ANC system. FIG. 11 shows a diagram of dynamic path PV calculations for a driver or passenger.

FIG. 1 shows an example of a vehicle system 100. In one example, the vehicle system 100 includes a controller 104 and a high frequency active noise cancellation (HF-ANC) system 102 comprising a plurality of speakers and a plurality of microphones. The various components of the HF-ANC system 102 may be controlled by the controller 104.

The vehicle system 100 may include a driver seat 124 and a plurality of passenger seats. For example, FIG. 1 includes a front passenger seat 126 and a pair of rear passenger seats 128, but in other examples, the vehicle may include more passenger seats or fewer passenger seats. In one example, a driver 160 is in the driver seat 124 and controls a steering wheel 130. A passenger 162 is seated in the front passenger seat 126. The vehicle may include a plurality of tires 132.

The vehicle system 100 includes a left door speaker 110, a right door speaker 112, a driver headrest left speaker 114, a driver headrest right speaker 116, a passenger headrest left speaker 118, a passenger headrest right speaker 120, and a rear speaker 122. There are seven speakers in FIG. 1, but in other examples, the vehicle system may include fewer, more, and/or differently positioned speakers. Speakers of the vehicle system 100 may include a variety of speaker types. For example, speakers may include any of loudspeakers, multi-way loudspeakers, subwoofers, woofers, mid-range speakers, tweeters, horns, and so on. Speakers of vehicle system 100 may include speaker arrays. The HF-ANC system 102 may operate one or more of the plurality of speakers to transmit anti-noise to reduce road noise that may be heard in a target space 192. In one example, the target space 192 may be an area proximate to a driver's ears, e.g., be proximate to the driver 160 in the driver seat 124.

The HF-ANC system 102 includes a plurality of physical error microphones and a plurality of virtual error microphones. The plurality physical error microphones may include a first dash microphone 134, a second dash microphone 136, a left door microphone 138, a right door microphone 140, a driver headrest left microphone 142, a driver headrest right microphone 144, a passenger headrest left microphone 146, and a passenger headrest right microphone 148. In one example, the first dash microphone 134 and the left door microphone 138 may be driver headline microphones. In one example, the second dash microphone 136 and the right door microphone 140 may be passenger headline microphones. The plurality virtual error microphones may include a driver left virtual microphone 150, a driver right virtual microphone 152, a passenger left virtual microphone 154, and a passenger right virtual microphone 156. There are eight physical error microphones and four virtual error microphones in FIG. 1, but in other examples, the vehicle system may include fewer, more, and/or differently positioned microphones. The plurality of microphones included in vehicle system 100 may be configured to receive voice commands from the driver 160 or other occupants, to measure ambient noise in the vehicle system 100, to measure an impulse response from one or multiple speakers to a location, and so on.

The vehicle system 100 may include an onboard transmitting device 108, which may feature a processor, a memory, a user interface, and an audio subsystem. In some examples, the onboard transmitting device 108 may be integrated into a dashboard 106 of the vehicle system 100. In some embodiments, the plurality of speakers are electronically coupled via a wired connection to the onboard transmitting device 108, whereby an audio output generated by the controller 104, such as a desired audio signal, or anti-noise, may be played via the plurality of speakers. For example, the controller 104 of the vehicle system 100 may process an audio signal, the audio signal including channel information, where the channel information is received and played at the plurality of speakers, respectively.

In one example, the controller 104 is shown in FIG. 1 as a microcomputer including a microprocessor unit 180, e.g., MIPS, and a memory 182, e.g., non-transitory memory, read-only memory, random access memory. The controller 104 may include input/output ports and a conventional data bus. The controller 104 may be in electronic communication with and receive information from a plurality of sensors 170 (e.g., accelerometers, gyroscopes, transducers, cameras, magnetometers, galvanometers, head position tracker) and may send control signals to a plurality of actuators 172, such as the speakers. The controller 104, while overseeing control and management of the vehicle system, may be configured to receive signals from the plurality of sensors 170, as further elaborated herein, in order to determine operating parameters and operating conditions, and correspondingly adjust various vehicle system actuators to control operation of the vehicle system. In some embodiments, the controller 104 may be in direct communication (e.g., wired) with the components of the vehicle system 100, and in other embodiments the controller 104 and components of the system may be in wireless communication.

In one example, the HF-ANC system 102 is a broad band noise cancellation system configured to reduce or eliminate undesired sounds associated with the vehicle system 100. For example, an undesired sound may be road noise 190 (represented as a dashed arrow) associated with, for example, tires 132. However, various undesired sounds may be targeted for reduction or elimination such as engine noise or any other undesired sound occurring in or associated with the vehicle system 100. The road noise 190 may be detected through at least one of the plurality of sensors 170 that provides at least one reference signal. In one example, the at least one of the plurality of sensors 170 may be an accelerometer, which may generate road noise signals, which serve as reference signals for the HF-ANC system 102, based on a current operating condition of the tires 132 and indicative of the level of the road noise 190. Other manners of sound detection may be implemented, such as microphones, non-acoustic sensors, or any other sensors suitable for detecting audible sounds associated with the vehicle system 100, e.g., the tires 132 or an engine 101.

In one example, the controller 104 is programmed to execute a high-frequency noise cancellation method including dynamic path management, which is described in detail herein. The controller 104 may process the reference signal through one or more filters and generate a noise cancellation or anti-noise signal based on the filtered noise signal. The controller 104 may command the HF-ANC system 102 to play the noise cancellation signal via one or more of the plurality of speakers (e.g., left door speaker 110, right door speaker 112, driver headrest left speaker 114, driver headrest right speaker 116, etc.) to produce a zone-of-quiet (ZoQ) in the proximity of the occupant. For example, the zone of quiet for the driver 160 may be in proximity to the target space 192.

The HF-ANC system 102 may use head-related impulse response filtering to produce the ZoQ. The ZoQ is sensitive to high-frequency noise, with the ZoQ area decreasing with increasing noise frequency. As such, the HF-ANC system 102 is increasingly sensitive to the head position or ear position of the occupant as the noise frequency increases (e.g., see FIGS. 8A-9). In one example, the head-related impulse response filtering comprises a set of head-related impulse responses (IRs) for the plurality of speakers and the plurality of microphones based on a head position of one or more occupants and a plurality of transfer functions describing signal characteristics on a secondary path, that is, between a plurality of sound production devices to a plurality of listening locations based on a head position (or ear position) of one or more vehicle occupants.

Depending on the configuration of the HF-ANC system, a total set of IRs on the secondary path can be very large. The total set of IRs on the secondary path may include a first IR set, a second IR set, and a third IR set. For example, the first IR set may include fifty-two impulse responses from the seven speakers to the eight physical error microphones included in the HF-ANC system 102. The second IR set may include twenty-eight impulse responses from the seven speakers to the four virtual error microphones included in the HF-ANC system 102. The third IR set may include thirty-two impulse responses from the eight physical error microphones to the four virtual error microphones included in the HF-ANC system 102. The controller 104 may measure the signal transfer characteristics in each set for a variety of occupant head positions, store the IR in memory, and retrieve the stored IRs to generate the noise cancellation signal. Similarly, the controller 104 may be in electronic communication with a stored database of head-related impulse responses, e.g., online.

The plurality of transfer functions used for the head-related impulse response filtering may be updated in response to a moving condition of one or more occupants. As such, the HF-ANC system may be operatively coupled to a system and method for head tracking. For example, the vehicle system 100 may include an optical sensor or a camera 166 coupled to the controller 104. The camera 166 may provide optical and/or photo image data to the controller 104 for use in head tracking. In some examples, the controller 104 may receive information from one or more seat position sensors 164.

The disclosed systems for HF-ANC, such as the HF-ANC system 102, include a dynamic path management (DPM) strategy to efficiently update head-related impulse responses in response to a movement condition of the vehicle occupants. For example, the controller 104 may receive a head position, a seat position, or an ear position signal from, for example, one or both of the driver 160 and the passenger 162. In response to the signal detecting head movement greater than a threshold, the controller 104 may selectively update only a subset of the plurality of transfer functions responsive to the sensor detecting head movement greater than a threshold. As used herein subset means less than the full set. As an example, only the subset is substantially less than a total set of head related impulse responses for the plurality of speakers and the plurality of microphones. In one example, substantially less is less than fifty percent of the total set. The controller 104 may retrieve from the memory 182 the IRs for the detected position and generate the noise cancellation signal including head related impulse filtering with the updated set. Such a strategy avoids memory and processing power limitations that challenge existing HF-ANC approaches while providing responsive management of the ZoQ for each occupant. Examples of the DPM strategy are described below in more detail.

FIG. 2 is a block diagram illustrating a high frequency active noise cancellation (HF-ANC) system 200 to reduce vehicle interior noise based on a dynamic path management (DPM) strategy. The HF-ANC system 200 may be the same or similar to the HF-ANC system 102 described with reference to FIG. 1. In one example, the HF-ANC system 200 may be implemented a vehicle system, such as the vehicle system 100 described with reference to FIG. 1. Signal paths are depicted in the diagram by a line with an arrow indicating a direction of signal transfer.

The HF-ANC system 200 includes a plurality of physical error microphones 204, a plurality of virtual error microphones 206, and a plurality of speakers 208. The HF-ANC system 200 further includes head position input 210 of the one or more occupants. Additionally or alternatively, the HF-ANC system 200 may include an ear position of the one or more occupants or a seat position. The head position input 210 may be obtained via one or more sensors, such as, for example, one of sensors 170, the camera 166, the seat position sensors 164, and so on described with reference to FIG. 1. The head position input 210 (or ear position) may be transmitted to a DPM strategy 212.

The HF-ANC system 200 may detect two ears, a head, or a seat position of the one or more occupants using a head/two ears tracking camera or seat position sensor to obtain occupant position information. As part of the DPM strategy 212, head related impulse responses for a plurality of possible occupant head positions are stored on a memory of a controller, such as an amplifier memory (e.g., controller 104, memory 182). Based on the head position input 210, the DPM strategy 212 will select representative sets of ear/head related IRs. The HF-ANC system 200 includes three IR sets. The three IR sets are estimated secondary paths. A first IR set having a transfer function $S'_P$ represents the transfer characteristics of the signal paths from the plurality of speakers 208 to the plurality of physical error microphones 204 (e.g., secondary path P). A second IR set having a transfer function $S'_v$ represents the transfer characteristics of the signal paths from the plurality of speakers 208 to the plurality of virtual error microphones 206 (e.g., secondary path V). A third IR set having the transfer function $S'_{PV}$ represents the transfer characteristics of the signal paths from the plurality of physical error microphones 204 to the plurality of virtual error microphones 206 (e.g., secondary path PV). The first IR set, the second IR set, and the third IR set may be obtained by off-line or on-line system identification and updated with appropriate IR measurements in response to detected movement.

The DPM strategy 212 changes a selected subset of transfer functions in each of the first IR set, the second IR set, and the third IR set by each IR in response to occupant movement, the selected subsets herein referred to as dynamic paths. In some examples, the dynamic paths include a dynamic path V, a dynamic path P, and a dynamic path PV. For example, a dynamic path P 224 has a transfer function $S'_{DPM\text{-}P}(Z)$ representing transfer characteristics of a subset of signal paths of the secondary path P. A dynamic path V 218 and a dynamic path V 226 have a transfer function $S'_{DPM\text{-}V}(Z)$ representing transfer characteristics of a subset of the signal paths of the secondary path V. A dynamic path PV 216 has a transfer function $S'_{DPM\text{-}PV}(Z)$ representing transfer characteristics of a subset of the signal paths of secondary path PV.

The HF-ANC system 200 includes a primary path 214 having a transfer function P(z) representing transfer characteristics of the signal path between a noise source 202 and a position of the listeners. The noise source 202 may produce one or more of a reference signal x(n) 201. The HF-ANC system 200 further includes a filter 222 having a transfer function W(z) and a least means squared filter (LMS filter) 220. The HF-ANC system 200 includes a secondary path 230 having a transfer function $S_p(z)$ representing the signal path between the plurality of speakers 208 playing a filtered signal y(n) 228 and the position of the listeners (e.g., from the plurality of the speakers 208 to the plurality of physical error microphones 204 and the virtual error microphones 206).

The HF-ANC system 200 supplies the reference signal x(n) 201 representing the noise source 202 to the filter 222. The filter 222 may impose a 180° phase shift onto the reference signal X(n) 201 to output the filtered signal y(n) 228 to be played via the one or more speakers 208. The filtered signal y(n) 228 may be supplied to the secondary path 230, the dynamic path P 224, and the dynamic path V 226.

The HF-ANC system 200 combines the filtered signal y(n) 228 via the real secondary path 230 with the reference signal x(n) 201 via the primary path 214 to form inputs to the plurality of physical error microphones 204, represented by a first summing node 234 that performs summation operations in the HF-ANC system 200 to produce the input signals for the plurality of physical error microphones 204, which are transformed into a first error signal 232. The filtered signal y(n) 228 via the dynamic path P 224 may be combined with the first error signal 232 to form inputs to dynamic path PV 216, represented by a second summing node 236. The output signal of the dynamic path PV 216 may be combined with the filtered signal y(n) 228 via the dynamic path V 226 to form inputs to the one or more virtual error microphones 206, represented by a third summing node 238 that performs summation operations in the HF-ANC system 200 to produce the input signals for the one or more virtual error microphones 206, which are transformed into a second error signal 240. The HF-ANC system 200 may include modifying the LMS filter 220 and the filter 222 based on the second error signal 240.

For example, virtual microphone technology (VMT) may use the Path PV, Path V, and Path P to estimate a virtual microphone signal, which is the second error signal 240. The LMS filter is updated by the estimated virtual microphone signals $e_v(n)$ and filtered reference signal x'(n) based on an LMS adaptive filter weight update process. Hence, it can cancel the noise at the virtual microphone location.

The DPM strategy 212 may selectively update a subset of the transfer functions represented by dynamic path V 218, 226, dynamic path P 224, and dynamic path PV 216 based on the head position input 210. In one example, signal pathway 242 and signal pathway 248 illustrate DPM strategy 212 selectively updating the dynamic path V 218 and the dynamic path V 226, respectively, based on the head position input 210. Signal pathway 244 illustrates DPM strategy 212 selectively updating the dynamic path P 224 based on the head position input 210. Signal pathway 246 illustrates DPM strategy 212 selectively updating dynamic path PV 216 based on the head position input 210.

A Table 1 is shown below illustrating an example of dynamic path management to selectively update the transfer functions represented by dynamic path V 218, 226, dynamic path P 224, and dynamic path PV 216 based on the head position input 210. As shown in Table 1, the dynamic path V may comprise a first set of transfer functions representing transfer characteristics of the signal paths from one or more headrest speakers to one or more virtual error microphones (e.g., driver headrest left speaker 114, driver headrest right speaker 116, driver left virtual microphone 150, etc.). The dynamic path P may comprise a second set of transfer functions representing transfer characteristics of the signal paths from one or more headrest speakers to one or more physical error microphones (e.g., passenger headrest left speaker 118, driver headrest right speaker 116, driver headrest right microphone 144, passenger headrest left microphone 146, etc.). The dynamic Path PV may comprise a third set of transfer functions representing transfer characteristics of the signal paths from one or more physical error microphones to one or more virtual error microphones (e.g., driver headrest left microphone 142, driver left virtual microphone 150, etc.). In some examples, the third set of transfer functions are seat position related. Seat position-related error microphone DPM may be calculated by an offline process and is described in detail in FIGS. 11, 5A-6.

TABLE 1

| Path | Feature | Dynamic Path Management |
|---|---|---|
| dynamic path V | Transfer functions from the speaker to virtual (ear) error microphone | Only switch the IR: Headrest SPK → Ear MIC |
| dynamic path P | Transfer functions from the speaker to the physical error microphone | Only switch the IR: Headrest SPK → Headrest MIC |
| dynamic path PV | Transfer functions from the physical error microphone to virtual (ear) error microphone | Seat position related error microphones: calculated by offline process |

In response to detected movement, in some examples, dynamic path management comprises updating only the subset of transfer functions on the dynamic path V, the dynamic path P, and the dynamic path PV. For example, dynamic path management may include updating the IRs with reference to Table 1. For these examples, the other IRs of the secondary path are not changed (e.g., maintained, static). For example, the HF-ANC system may maintain the transfer functions corresponding to one or more of a plurality of door speakers (e.g., left door speaker 110, right door speaker 112 in FIG. 1), one or more of a plurality of rear speakers (e.g., rear speaker 122), such as a woofers or subwoofers, one or more of the plurality of microphones such as the right door microphone and the left door microphone (e.g., left door microphone 138, right door microphone 140).

Turning briefly to FIG. 11, a dynamic path PV calculation method 1100 is show. To accurately calculate the dynamic path PV described above, the dynamic path PV calculation method 1100 is developed. In the example vehicle configuration described with reference to the HF-ANC system 102, driver virtual microphones $d_v$ 1102 include driver left virtual microphone 150 and driver right virtual microphone 152. The driver physical microphones $d_p$ 1104 include the driver headrest left microphone 142, the driver headrest right microphone 144, the left door microphone 138, and first dash microphone 134. In the dynamic path PV, residual signal e can be calculated as the following equations:

$$e_l(n) = d_{v_l}(n) - y_{pv_l}(n) = d_{v_l}(n) - \sum_{k=1}^{K} d_{p_k}(n) * S_{pv_{kl}}(n)$$

$$S_{pv}(z) = \begin{bmatrix} S_{pv_{11}}(z) & \dots & S_{pv_{1l}}(z) \\ \vdots & \dots & \vdots \\ S_{pv_{k1}}(z) & \dots & S_{pv_{kl}}(z)) \end{bmatrix}_{K \times L}$$

where $d_{v_l}(n)$ is the lth driver virtual error microphone signal and $d_{p_k}(n)$ is the kth driver physical error microphone signal, $S_{pv}$ is the matrix of the dynamic path PV and $S_{pv_{kl}}$ is dynamic path PV from kth driver physical error microphone to lth driver virtual error microphone signal. Hence, driver dynamic path PV can be calculated by least mean square (LMS) by the following equation:

$$S_{pv_{kl}}(n+1) = S_{pv_{kl}}(n) + \mu_{pv} d_{p_k}(n) e_{v_l}(n) / \left(d_{p_k}(n) d_{p_k}^T(n) + \alpha\right);$$

where $\mu_{pv}$ is the step size of dynamic path PV calculation, and α is a constant value to avoid the step size too large. It is clear that it is independent path PV not related to others occupants' movement effect. For the dynamic path PV on passenger seat, it can be calculated in the same way.

Note that for the traditional method, path PV calculation is based on all physical microphone signals (driver and passenger), the path PV is a dependent Path PV demanding a huge memory.

FIG. 3 is a flow chart of a method 300 for operating a dynamic path management strategy to control a high frequency active noise cancellation (HF-ANC) system. The dynamic path management strategy may be the same or similar to the strategy described with reference to the HF-ANC system 102 and the HF-ANC system 200 in FIGS. 1-2, respectively. Instructions for carrying out the method 300 may be executed by a controller based on computer readable instructions stored on a memory of the controller and in conjunction with signals received from sensors of the vehicle system, such as the controller 104 and the plurality of microphones (e.g., first dash microphone 134, second dash microphone 136, left door microphone 138, right door microphone 140, etc.) described above with reference to FIG. 1. The controller may employ actuators of the vehicle system, such as the plurality of speakers (e.g., left door speaker 110, a right door speaker 112, etc.), to adjust vehicle system operation, according to the methods described below.

At 302, the method 300 includes tracking head position of one or more vehicle occupants. In some examples, a sensor may track head position of the one or more vehicle occupants. In one example, the sensor may be a camera, such as the camera 166 described with reference to FIG. 1. In other examples, the sensor may be a seat position sensor, such as the seat position sensors 164 described with reference to FIG. 1. Other examples of the method 300 may use different or additional sensors and strategies for tracking head position.

At 304, the method 300 includes determining whether head movement of one or more vehicle occupants is detected. For example, the method 300 may determine head movement is detected in response to the controller receiving a head movement signal via the camera. Additionally or alternatively, the method 300 may determine movement is detected in response to the controller receiving a head movement signal via the seat position sensor.

In response to not detecting movement, the method 300 includes keeping the current IR sets at 306. For example, the first IR set representing the secondary path P, the second IR set representing the secondary path V, and the third IR set representing the secondary path PV (e.g., described with reference to FIG. 1 and FIG. 2) may be maintained for the current head positions of the vehicle occupants. At 308, the method 300 includes operating the HF-ANC system to reduce undesired vehicle noise using on the current IR sets, such as described with reference to FIG. 1 and FIG. 2. For example, the method 300 may include generating a noise cancellation signal using a set of head-related impulse responses for the plurality of speakers and the plurality of microphones based on the current head positions of the one or more occupants.

Returning to 304, in response to the head tracker detecting movement, the method 300 includes determining whether the head movement detected at 304 is greater than a head movement threshold at 310. The head movement threshold may be a non-zero positive value threshold. In one example, the head movement threshold may be an amount of movement. For example, the head movement threshold may be a difference of two inches from an initial position (e.g., stored as a flag).

In response to the detected head movement being less than the head movement threshold, the method 300 includes keeping the current IR sets at 312. For example, the first IR set representing the secondary path P, the second IR set representing the secondary path V, and the third IR set representing the secondary path PV (e.g., described with reference to FIG. 1 and FIG. 2) may be maintained for the current head positions of the vehicle occupants. At 314, the method 300 includes operating the HF-ANC system to reduce undesired vehicle noise using on the current IR sets, such as described with reference to FIG. 1 and FIG. 2.

Returning to 310, in response to the head tracker detecting movement greater than the head movement threshold, the method 300 includes selecting a subset of the transfer functions to update based on a new head position at 316. In one example, the subset of transfer functions may be the transfer functions described with reference to Table 1. In one example, selecting a subset of transfer functions to update may include inputting the new head position into a multi-dimensional matrix. For example, based on the head position, the multi-dimensional matrix may output a subset of transfer functions that may be updated with stored IRs. In one example, the head position may include one or more of a movement direction, a movement distance, and a movement displacement. For example, the head position may include one or more of forward and backward movement, left and right movement, up and down movement. In another example, a movement amount may include two inches in a direction, three inches in a direction. In one example, a selected subset of transfer functions to update may include the headrest speakers to ear error microphones, headrest speakers to headrest error microphones, and headrest error microphones.

At 318, the method 300 includes retrieving IRs for the selected subset of transfer functions. For example, the method 300 may include going to a stored database of head-related impulse responses. The IRs may be retrieved from the memory of the controller (e.g., amplifier memory). For example, the controller may access a stored database of IRs.

The method 300 includes adjusting the dynamic paths of the HF-ANC system in parallel. At 320, the method 300 includes adjusting path P to dynamic path P using the IRs retrieved at 318 for the selected subset. At 322, the method 300 includes adjusting path V to dynamic path V using the IRs retrieved at 318 for the selected subset. At 324, the method 300 includes adjusting path PV to dynamic path PV using the IRs retrieved at 318 for the selected subset.

At 326, the method 300 includes operating the HF-ANC system to reduce undesired vehicle noise using head-related impulse response filtering with the updated IRs, such as described with reference to FIG. 1 and FIG. 2.

FIG. 4 shows an example of a first set 400 of frequency responses on a secondary path for a high frequency active noise control (HF-ANC) system. The HF-ANC system may be the same or similar to the HF-ANC system 102 and HF-ANC system 200, comprising seven speakers, eight physical error microphones, four virtual error microphones, and a controller having instructions for operating a dynamic path management (DPM) strategy, such as described with reference to FIG. 1 and FIG. 2, respectively. For each plot shown in the first set 400, frequency in Hertz (Hz) is represented on an x-axis and a magnitude of response in decibels (dB) is plotted on a y-axis.

The first set 400 includes plots of frequency response on a secondary path P comprising seven speakers to eight physical error microphones, which may be fifty-six measurements. In one example, the secondary path P may be the same or similar to the secondary path P described with reference to FIG. 2. In each plot, solid lines show the frequency responses for a first head position. For example, plot 402 shows the frequency response from a first speaker to a first physical microphone (S1-M1) and plot 404 shows the frequency response from the first speaker to a second physical microphone (S1-M2). Without DPM, in response to the head movements of an occupant, all fifty-six measurements on the secondary path P may be updated with new frequency response plots to accommodate the change. For example, the controller may retrieve from memory the frequency responses corresponding to the new occupant head position. In contrast, with DPM, substantially fewer transfer functions are updated without sacrificing road noise control performance.

Using the DPM approach, in response to detected head movement, a subset of transfer functions on the secondary path P is updated and the rest are maintained static or unchanged. In one example, the subset of transfer functions may be referred to as a dynamic path P. In one example, the dynamic path P is the same or similar to the dynamic path P described with reference to FIGS. 2-3. In one example, dynamic path P may include the subset of transfer functions from a plurality of headrest speakers to a plurality of headrest physical error microphones. In the example shown, the dynamic path P includes a driver subset 408 and a passenger subset 410. The driver subset 408 may include the driver headrest mounted speakers (e.g., driver headrest left speaker 114, driver headrest right speaker 116) and physical error microphones (e.g., driver headrest left microphone 142, driver headrest right microphone 144). The passenger subset 410 may include the passenger headrest mounted speakers (e.g., passenger headrest left speaker 118, passenger headrest right speaker 120) and physical error microphones (e.g., passenger left microphone 146, passenger headrest right microphone 148).

In one example, under a first condition comprising a first head movement, the driver subset 408 and the passenger subset 410 are updated based on the first head movement. For example, in response to detecting the first head movement, the updated driver position IRs include the first speaker and a third microphone (S1-M3) in plot 412, the first speaker and a fourth microphone (S1-M4) in plot 414, the second speaker and the third microphone (S2-M3) in plot 416, and the second speaker and the fourth microphone (S2-M4) in plot 418, shown in dotted lines. The updated passenger position IRs include the third speaker and the first microphone (S3-M1) in plot 420, the third speaker and the second microphone (S3-M2) in plot 422, the fourth speaker and the first microphone (S4-M1) in plot 424, and the fourth speaker and the second microphone (S4-M2) in plot 426, shown in dotted lines.

As shown in the example, the dynamic path P reduces updating head-related impulse responses on the secondary path P in response to detected movement to four transfer functions for the driver and four transfer functions for the passenger. The rest of the IRs on the secondary path P are maintained, such as, for example, the transfer functions corresponding to the right door speaker, the left door speaker, the rear speaker, the right door microphone, the left door microphone, the first dash microphone, the second dash microphone, and so on. In this way, HF-ANC based on DPM reduces high-frequency noise at time saving substantial memory and processing demand compared with the traditional HF-ANC approach.

In other examples, under a second condition comprising a second head movement, the driver position subset and the passenger position subset may be a second, different, subset of the plurality of transfer functions for the speaker-microphone pairs (e.g., S1-M1, S1-M2, etc.) updated based on the second head movement. In yet other examples, under a third condition comprising a third head movement, the driver position subset and the passenger position subset may be the same speaker-microphone pairs (e.g., S1-M3, S1-M4, etc.) updated based on the third head movement.

The secondary path P and the secondary path PV (e.g., as described with reference to FIGS. 2-3) may be updated similarly in response to detected movement by changing a subset of dynamic IRs and maintaining static IRs. An example of DPM for the secondary path PV is described with reference to FIGS. 5A-6.

FIG. 5A shows an example 500 of coupling between a plurality of physical microphones and a plurality of virtual microphones. FIG. 5B shows an example 550 of a dynamic path management strategy applied to decoupling.

FIG. 5A shows, in the prior art, secondary path PV is determined by all virtual microphone signals and physical microphone signals. Further, in the prior art, secondary path PV is affected by the coupling effect such that the secondary path PV calculation includes all physical microphones coupled to each of the virtual microphones. In a first example, in response to movement of the driver 160, IRs on the secondary path PV are updated to accommodate the new position of the driver 160. The first example is shown by dashed lines 502 representing Path PV between the physical error microphones (e.g., first dash microphone 134, second dash microphone 136, left door microphone 138, right door microphone 140, etc.) and the passenger left virtual microphone 154. For an HF-ANC system with eight physical error microphones, such as HF-ANC system 102, there are eight IRs on secondary path PV for the left virtual microphone 154. Head-related impulse responses between the eight physical error microphones and each of the passenger right virtual microphone 156, the driver left virtual microphone 150, and the driver right virtual microphone 152 may update similarly in response to movement.

In the secondary path PV calculation where the coupling effect is unresolved, as described in the first example above, IRs on the secondary path PV are updated in response to movement of the driver when the passenger movement is constant. Similarly, in a second example, IRs on the secondary path PV are updated in response to movement of the passenger when the driver movement is constant. The first example and the second example may represent different sets of IRs that are stored in memory, retrieved in response to a movement condition, and updated in the secondary path PV calculation. Hence, secondary path PV demands measuring, storing, and retrieving very large numbers of IRs to account for different occupant location conditions.

FIG. 5B shows the dynamic path PV calculation. The dynamic path PV having the transfer function $S'_{DPM\text{-}PV}{}^{(Z)}$ applies a decoupling method to solve the coupling issue on the Path PV. The dynamic path PV calculation is based on each seat position, where each virtual microphone is coupled to a subset of physical microphones based a seat position.

For example, under a first condition comprising a first head movement of the passenger 162, dashed lines 552 represent dynamic path PV between the physical error microphones and the passenger left virtual microphone 154. For an HF-ANC system with eight physical error microphones, there are four IRs on dynamic path PV for the passenger left virtual microphone 154. Similarly, there are four IRs on dynamic path PV for the passenger right virtual microphone 156. Transfer functions from the four physical error microphones to each of the passenger virtual error microphones may updated in response to detected movement of the passenger 162.

In the dynamic path PV calculation where the coupling effect is resolved, as described in the above example, in response to movement of the passenger, IRs for the physical error microphones and virtual error microphones assigned to the passenger position (e.g., seat position) are updated and not the driver. Similarly, under a second condition comprising a second head movement of the driver, IRs for the physical error microphones and virtual error microphones assigned to the driver position (e.g., seat position) are updated and not the driver. Hence, dynamic path PV demands fewer IRs, less memory storage, and less frequent retrieving and updating to account for different occupant location conditions. In this way, memory storage and processing power demands are reduced.

FIG. 6 shows an example of a third set 600 of frequency responses on a secondary path for a high frequency active noise control (HF-ANC) system. The HF-ANC system may be the same or similar to the HF-ANC system 102 and HF-ANC system 200, comprising seven speakers, eight physical error microphones, four virtual error microphones, and a controller having instructions for operating a dynamic path management (DPM) strategy, such as described with reference to FIG. 1 and FIG. 2, respectively. For each plot shown in the third IR set, frequency in Hertz (Hz) is represented on an x-axis and a magnitude of response in decibels (dB) is plotted on a y-axis.

The third set 600 includes plots of frequency response from the eight physical error microphones to the four virtual error microphones, which may be thirty-two measurements. In each plot, solid lines show the third set 600 for a first head position. For example, plot 602 shows the frequency response from a third physical microphone to a first virtual microphone (P3-V1) and plot 604 shows the frequency response from a fourth physical microphone to the first virtual microphone (P4-V1). Without DPM, in response to detected movement of an occupant, all thirty-two measurements are updated to accommodate the change, shown in solid lines. In contrast, with DPM, substantially fewer measurements are updated without sacrificing road noise control performance.

Using the DPM approach, in response to detected head movement, only a subset of the plurality of transfer functions, herein the dynamic path PV, is updated and the rest maintained static or unchanged. In the example shown, the dynamic path PV may include a driver subset 606 and a passenger subset 608. In one example, the driver subset 606 may include the driver virtual microphones (e.g., driver left virtual microphone 150, a driver right virtual microphone 152) and one or more of the plurality of physical error microphones (e.g., driver headrest left microphone 142, driver headrest right microphone 144, first dash microphone 134, and left door microphone 138). The passenger subset 608 may include the passenger virtual microphones (e.g., passenger left virtual microphone 154, passenger right virtual microphone 156) and one or more of the plurality of physical error microphones (e.g., passenger headrest left microphone 146, passenger headrest right microphone 148, second dash microphone 136, right door microphone 140). The driver subset 606 and the passenger subset 608 are updated with different IRs to in response to detected head movement.

In addition, the third set 600 includes a decoupling approach, such as the decoupling approach described with reference to FIGS. 5A-5B. The decoupling approach enables the HF-ANC system to update IRs associated with a seat position. For example, IRs represented by the driver subset 606 are updated in response to detected driver movement and IRs represented by the passenger subset 608 are updated in response to detected passenger movement.

For example, under a first condition comprising detected head movement of a driver, the DPM strategy updates the driver subset 606. In the example shown, the driver subset 606 includes the subset of transfer functions for a third physical microphone and a third virtual microphone (P3-V3) in plot 626, a fourth physical microphone and the third virtual microphone (P4-V3) in plot 628, a fifth physical microphone and the third virtual microphone (P5-V3) in plot 630, a sixth physical microphone and the third virtual microphone (P6-V3) in plot 632, the third physical microphone and the fourth virtual microphone (P3-V3) in plot 634, the fourth physical microphone and the fourth virtual microphone (P4-V3) in plot 636, the fifth physical microphone and the fourth virtual microphone (P5-V3) in plot 638, the sixth physical microphone and the fourth virtual microphone (P6-V3) in plot 640, shown in dotted lines.

For example, under a second condition comprising detected head movement of a passenger, the DPM strategy updates the passenger subset 608. In the example shown, the passenger subset 608 includes the subset of transfer functions for a first physical microphone and a first virtual microphone (P1-V1) in plot 610, a second physical microphone and the first virtual microphone (P2-V1) in plot 612, the first physical microphone and a second virtual microphone (P1-V2) in plot 614, the second physical microphone and the second virtual microphone (P2-V2) in plot 616, a seventh physical microphone and the first virtual microphone (P7-V1) in plot 618, an eighth physical microphone and the first virtual microphone (P8-V1) in plot 620, the seventh physical microphone and the second virtual microphone (P7-V2) in plot 622, the eighth physical microphone and the second virtual microphone (P8-V2) in plot 624, shown in dotted lines.

In other examples, under a third condition comprising a second head movement of the driver (or the passenger), the driver position subset may be a different set of physical-virtual microphone pairs (e.g., P5-V1, P6-V1, etc.) updated with different IRs based on the second head movement. In yet other examples, in response to the third head movement of the driver (or the passenger), the driver position subset may be the same physical-virtual microphone pairs (e.g., P1-V1, P2-V1, etc.) updated with different IRs based on the third head movement.

The disclosed dynamic path PV reduces IR updating of the third set to eight transfer functions for driver and eight transfer functions for the passenger. In this way, HF-ANC based on DPM may save fifty percent memory compared with an HF-ANC approach that does not include dynamic path management and decoupling.

FIG. 7A and FIG. 7B are a diagram and a plot, respectively, illustrating an effect of listener head movement on performance of an exemplary ANC system.

FIG. 7A shows an ANC system 700 including a listener 760. The listener 760 may move between a front position 702 and a rear position 704. An intermediate position 706 is indicated by a dashed line. For example, when the listener 760 moves from the intermediate position 706 to the front position 702 or to the rear position 704, a head related transfer function from a first headrest speaker 710 to a first outboard ear microphone 708 exhibits substantial differences due to the position and distance change between the first headrest speaker 710 and the first outboard ear microphone 708.

FIG. 7B shows a plot 750 illustrating frequency response from the first headrest speaker 710 to the first outboard ear microphone 708 for the front position 702, the intermediate position 706, and the rear position 704. In the plot 750, frequency in Hz is plotted on the x-axis and magnitude in dB(A) is plotted on the y-axis.

Plot line 752 is the frequency response on the intermediate position 706, plot line 754 is the frequency response on the front position 702 (e.g., all the way front), and plot line 756 is the frequency response on the rear position 704 (e.g., all the way back). The plot 750 shows in the low frequency range (0 Hz to 300 Hz) frequency responses have similar magnitude. However, differences between the plot lines are substantial above 400 Hz because of the ear position movement of the listener 760. ANC system performance may be substantially degraded by using an inappropriate IR (e.g., not matching to the head or ear location IR), including less effective noise reduction and, in some examples, may produce a boosting issue (e.g., amplifying undesired noise), especially on the high frequency range. An advantage of the disclosed HF-ANC systems and methods is reduced memory demand and computational complexity to select and adjust appropriate IRs in response to changes to ear/head position of one or more vehicle occupants.

FIG. 8 shows an example diagram 800 illustrating a DPM strategy 806 for controlling an HF-ANC system 801. The DPM strategy 806 may be the same or similar to the strategy described with reference to the HF-ANC system 102 and the HF-ANC system 200 in FIGS. 1-2, respectively. Components introduced with reference to the HF-ANC system 102 and the HF-ANC system 200 may be understood to be included in HF-ANC system 801 and may not be reintroduced. Further, some components of HF-ANC system 102 and HF-ANC system 200 may not be shown, although it may be understood that they may also be included in the HF-ANC system 801. For example, the HF-ANC system 801 comprises the camera 166 for tracking a head position of one or more vehicle occupants (e.g., passenger 162), the plurality of speakers, and the plurality of microphones including, such as, the right door speaker 112, the rear speaker 122, the passenger headrest left speaker 118, the passenger headrest right speaker 120, the passenger headrest right microphone 148, the passenger headrest left microphone 146, the passenger left virtual microphone 154, and the passenger right virtual microphone 156.

The HF-ANC system 801 includes a grid 802 for tracking head movement. For example, the grid 802 includes a first position (1), a second position (2), a third position (3), a fourth position (4), a fifth position (5), a sixth position (6), a seventh position (7), and an eighth position (8). The camera 166 may track a position of ears 804 of the passenger 162 in the grid 802. The camera 166 may transmit a position signal 814 indicating a position of the ears 804 to the DPM strategy 806.

The HF-ANC system 801 generates a noise cancellation signal using a set of head-related impulse responses for a plurality of speakers and a plurality of microphones based on a head position of one or more occupants, and selectively changing only a subset of transfer functions applied with the set of head-related impulse responses in response to the head position. For example, in response to detecting a first position of the passenger 162, the DPM strategy 806 includes going to a stored database of head-related impulse responses, selecting only a first subset of transfer functions comprising the head-related impulse response filtering, and updating only the first subset based on the first position. In response to detecting a second position of the passenger 162, the DPM strategy 806 includes going to a stored database of head-related impulse responses, selecting only a second, different, subset of transfer functions comprising the head-related impulse response filtering, and updating only the second subset based on the second position. For example, the DPM strategy 806 receives the position signal 814 indicating the position as ear/headrest speaker location information at strategy block 808 and transmits the information to dynamic path management at strategy block 810. At strategy block 810, the ear/headrest speaker location information may be used for selecting the subset of transfer functions to update on dynamic path P, dynamic path V, and dynamic path PV.

For example, if the passenger 162 moves backward 6 inches, the ears 804 are detected in the fifth position (5) and the sixth position (6) of the grid 802 by the camera 166. In response, the DPM strategy 806 replaces IRs for the selected subset in the dynamic path P, the dynamic path V, and the dynamic path PV on the HF-ANC system 801. For example, based on the first position, the first subset of transfer functions may include a first speaker set and a first microphone set. For example, IRs on the passenger headrest left speaker 118 and the passenger headrest right speaker 120 to the passenger headrest left microphone 146 and the passenger headrest right microphone 148, the passenger headrest left speaker 118 and the passenger headrest right speaker 120 to the passenger left virtual microphone 154 and the passenger right virtual microphone 156, and the passenger headrest left microphone 146 and the passenger headrest right microphone 148 to the passenger left virtual microphone 154 and the passenger right virtual microphone 156 are switched to the IRs stored in memory related to the ears 804 in in the fifth position (5) and the sixth position (6).

In another example, if the passenger 162 moves forward 3 inches and rightward 3 inches, the ears 804 are detected in the second position (2) of the grid 802 by the camera 166. In response, the DPM strategy 806 replaces IR measurements for the selected subset in the dynamic path P, the dynamic path V, and the dynamic path PV on the HF-ANC system 801. For example, based on the second position, the second subset of transfer functions may include a second speaker set and a second microphone set. For example, IRs on the right door speaker 112 and the passenger headrest right speaker 120 to the passenger headrest left microphone 146 and the passenger headrest right microphone 148, the right door speaker 112 and the passenger headrest right speaker 120 to the passenger left virtual microphone 154 and the passenger right virtual microphone 156, and the passenger headrest left microphone 146 and the passenger headrest right microphone 148 to the passenger left virtual microphone 154 and the passenger right virtual microphone 156 are switched to the IRs stored in memory related to the ears 804 in in the second position (2). In some examples, dynamic path P and dynamic path V may be obtained by an off-line system identification method (e.g., stored in memory 182). Dynamic path PV may be calculated by the decoupled system identification method (e.g., as shown in FIGS. 5B-6).

At strategy block 812, the HF-ANC system 801 generates a noise cancellation signal 816 and transmits the noise cancellation signal 816 to be played via the plurality of speakers, including, but not limited to, the right door speaker 112, the passenger headrest left speaker 118, and the passenger headrest right speaker 120. The plurality of error microphones (e.g., the passenger headrest left microphone 146, the passenger left virtual microphone 154, etc.), transmit an error signal 818 to the HF-ANC system 801 at strategy block 812 for adapting the noise cancellation signal 816 based on the error signal 818.

In one example, various movement types may be detected by the camera 166 and in response, different subsets of transfer functions may be updated. For example, detected movement may include one or more of a movement distance and movement direction, such as, left and right movement, up and down movement, forward and backward movement, movement distance. As an example, under a first condition comprising left and right movement, such as, the ears 804 moving from the third position (3) to the fourth position (4) in grid 802, DPM strategy 806 may update only a first subset of transfer functions. Under a second condition comprising forward and backward movement, such as, the ears 804 moving from the third position (3) to the seventh position (7) in grid 802, DPM strategy 806 may update only a second subset of transfer functions. Under a third condition comprising up and down movement, such as, the ears 804 detected in a three-dimensional grid (not shown), DPM strategy 806 may update only a third subset of transfer functions. In such an example, only the first subset, only the second subset, and only the third subset are each less than a total set of transfer functions representing the head-related impulse responses for the plurality of speakers and the plurality of microphones.

FIG. 9 shows a first plot 900 and a second plot 910 illustrating ANC performance between an ANC strategy without DPM and an example of the disclosed ANC strategy with DPM. In each plot, frequency in Hz is plotted on the x-axis and sound pressure level (SPL) in dB(A) is plotted on the y-axis. The DPM strategy may be the same or similar to the DPM strategy illustrated with reference to the HF-ANC system 102, the HF-ANC system 200, and HF-ANC system 801 in FIGS. 1, 2, and 8, respectively.

SPL over a range of broad band frequencies for a passenger ear in is illustrated in first plot 900. In the first plot 900, SPL over a range of broad band frequencies without ANC (e.g., control sample) is shown by plot line 902 (black), with ANC operating without DPM is shown by plot line 904 (grey), and ANC operating with DPM is shown by plot line 906 (dotted). Plot line 904 and plot line 906 show approximately similar reductions of SPL for ANC and ANC with DPM, respectively, compared to the control across the 0-1000 Hz range.

SPL over a range of broad band frequencies for a passenger ear out is illustrated in the second plot 910. In the second plot 910, SPL over a range of broad band frequencies without ANC (e.g., control sample) is shown by plot line 912 (black), with ANC operating without DPM is shown by plot line 914 (grey), and ANC operating with DPM is shown by plot line 916 (dotted). Plot line 914 and plot line 916 show approximately similar reductions of SPL for ANC and ANC with DPM, respectively, compared to the control across the 0-1000 Hz range.

FIG. 10 shows plots illustrating ANC performance between an ANC strategy without DPM and the disclosed ANC strategy with DPM. In each plot, frequency in Hz is plotted on the x-axis and sound pressure level (SPL) in dB(A) is plotted on the y-axis.

SPL over a range of broad band frequencies for a driver ear out is illustrated in plot 1000. In the plot 1000, SPL over a range of broad band frequencies without ANC (e.g., control sample) is shown by plot line 1002 (black), with ANC operating without DPM is shown by plot line 1004 (grey), and ANC operating with DPM is shown by plot line 1006 (dotted). Plot line 1004 and plot line 1006 show approximately similar reductions of SPL for ANC and ANC with DPM, respectively, compared to the control across the 0-1000 Hz range.

SPL over a range of broad band frequencies for a driver ear in is illustrated in plot 1010. In the plot 1010, SPL over a range of broad band frequencies without ANC (e.g., control sample) is shown by plot line 1012 (black), with ANC operating without DPM is shown by plot line 1014 (grey), and ANC operating with DPM is shown by plot line 1016 (dotted). Plot line 1014 and plot line 1016 show approximately similar reductions of SPL for ANC and ANC with DPM, respectively, compared to the control across the 0-1000 Hz range.

SPL over a range of broad band frequencies for a passenger ear in is illustrated in plot 1020. In the plot 1020, SPL over a range of broad band frequencies without ANC (e.g., control sample) is shown by plot line 1022 (black), with ANC operating without DPM is shown by plot line 1024 (grey), and ANC operating with DPM is shown by plot line 1026 (dotted). Plot line 1024 and plot line 1026 show approximately similar reductions of SPL for ANC and ANC with DPM, respectively, compared to the control across the 0-1000 Hz range.

SPL over a range of broad band frequencies for a passenger ear out is illustrated in plot 1030. In the plot 1030, SPL over a range of broad band frequencies without ANC (e.g., control sample) is shown by plot line 1032 (black), with ANC operating without DPM is shown by plot line 1034 (grey), and ANC operating with DPM is shown by plot line 1036 (dotted). Plot line 1034 and plot line 1036 show approximately similar reductions of SPL for ANC and ANC with DPM, respectively, compared to the control across the 0-1000 Hz range.

This disclosure provides an efficient strategy for an HF-ANC system to solve the coupling effect between movements of the occupants and to maintain the HF-ANC system performance and stability. The strategy includes dynamic path management, which provides a decoupling method for the HF-ANC system that significantly reduces DSP memory and MIPS. The disclosure also maintains the HF-ANC system performance in the passenger cabin. Dynamic path management implements an IR organization and calculation topology to adjust the set of IRs to avoid the independent effects on IRs and save DSP memory and MIPS. As an advantage, low frequency noise may be covered by some of the speakers, such as dual door speakers and rear speakers, such as a subwoofer, which are fixed, while the high frequency noise is covered by other speakers, such as headrest speakers. The system may mix and match the DPM-controlled speakers and the fixed speakers, combining features to get the best from the audio architecture. Benefits of the strategy included maintaining (or limited adjustment) in the low frequency and selective adjustment in the high frequency. In this way, an active noise cancellation system may provide interior noise reduction for high and low frequency noise with reduced computational complexity.

The disclosure also provides support for a noise cancellation system, comprising: a vehicle having a plurality of speakers and a plurality of microphones, a plurality of sensors, and a controller with computer readable instructions stored on non-transitory memory that when executed cause the controller to: generate a noise cancellation signal using a set of head-related impulse responses for the plurality of speakers and the plurality of microphones based on a head position of one or more occupants and a plurality of transfer functions, including to selectively update only a subset of the plurality of transfer functions responsive to the plurality of sensors detecting head movement greater than a threshold. In a first example of the system, only the subset is substantially less than a total set of head-related impulse responses for the plurality of speakers and the plurality of microphones. In a second example of the system, optionally including the first example, the plurality of speakers comprises a first speaker set and a second speaker set, the first speaker set different from the second speaker set, the first speaker set and the second speaker set are less than the plurality of speakers, and the controller further includes computer readable instructions that when executed cause the controller to: under a condition comprising a first head movement, update only a first subset of the plurality of transfer functions for the first speaker set based on the first head movement, and under a second condition comprising a second head movement, update only a second, different, subset of the plurality of transfer functions for the second speaker set based on the second head movement. In a third example of the system, optionally including one or both of the first and second examples, the plurality of speakers comprises a first speaker, a second speaker, and a third speaker, and a fourth speaker, and the plurality of microphones comprises a first microphone, a second microphone, a third microphone, and a fourth microphone and the controller further includes computer readable instructions that when executed cause the controller to: under a first condition comprising a first head movement, update only a first subset of the plurality of transfer functions for the first speaker to the first microphone, the first speaker to the second microphone, and the first microphone to the second microphone based on the first head movement, and under a second condition comprising a second head movement, update only a second, different, subset of the plurality of transfer functions for the second speaker to the first microphone, the second speaker to the second microphone, and the first microphone to the second microphone based on the second head movement. In a fourth example of the system, optionally including one or more or each of the first through third examples, the controller further includes computer readable instructions that when executed cause the controller to: under a first condition comprising left and right movement, update only a first subset of transfer functions, and under a second condition comprising forward and backward movement, update only a second subset of transfer functions, and under a third condition comprising up and down movement, update only a third subset of transfer functions, wherein only the first subset, only the second subset and only the third subset are each less than a total set of transfer functions representing the head-related impulse responses for the plurality of speakers and the plurality of microphones. In a fifth example of the system, optionally including one or more or each of the first through fourth examples, the plurality of speakers comprises a plurality of headrest speakers, a plurality of door speakers, and a rear speaker, and the plurality of microphones comprises a plurality of virtual error microphones and a plurality of physical error microphones. In a sixth example of the system, optionally including one or more or each of the first through fifth examples, only the subset comprises a first set of transfer functions from a plurality of headrest speakers to a plurality of headrest physical error microphones, a second set from the plurality of headrest speakers to a plurality of virtual error microphones, and a third set from the plurality of headrest physical error microphones to the plurality of virtual error microphones. In a seventh example of the system, optionally including one or more or each of the first through sixth examples, the third set comprises a driver subset and a passenger subset, the passenger subset comprising headrest physical error microphones and virtual error microphones not included in the driver subset, and the driver subset comprising headrest physical error microphones and virtual error microphones not included in the passenger subset, and the controller further includes computer readable instructions that when executed cause the controller to: under a first condition comprising the head movement of a driver, update the driver subset of the third set, and under a second condition comprising the head movement of a passenger, update the passenger subset of the third set.

The disclosure also provides support for a method for a vehicle, the method comprising: generating a noise cancellation signal using a set of head-related impulse responses for a plurality of speakers and a plurality of microphones based on a head position of one or more occupants, and selectively changing only a subset of transfer functions applied with the set of head-related impulse responses in response to the head position. In a first example of the method, the method further comprises reducing high frequency noise in response to detected movement of one or more of occupants, and maintaining the rest of the head-related impulse responses. In a second example of the method, optionally including the first example, only the subset is substantially less than a total set of head-related impulse responses for the plurality of speakers and the plurality of microphones. In a third example of the method, optionally including one or both of the first and second examples, selectively changing comprises detecting the head position from a sensor, selecting a subset of transfer functions based on the head position, retrieving the transfer functions from memory, and processing the noise cancellation signal with the subset. In a fourth example of the method, optionally including one or more or each of the first through third examples, the plurality of speakers comprises a plurality of headrest speakers, a plurality of door speakers, and a rear speaker, the plurality of microphones comprises a plurality of virtual error microphones, a plurality of physical error microphones. In a fifth example of the method, optionally including one or more or each of the first through fourth examples, only the subset comprises a first set of transfer functions from a plurality of headrest speakers to a plurality of headrest physical error microphones, a second set from the plurality of headrest speakers to a plurality of virtual error microphones, and a third set from the plurality of headrest physical error microphones to the plurality of virtual error microphones.

The disclosure also provides support for a system comprising: a vehicle, one or more occupants positioned in the vehicle, a plurality of speakers comprising a left door speaker, a right door speaker, a driver headrest left speaker, a driver headrest right speaker, a passenger headrest left speaker, a passenger headrest right speaker, and a rear speaker positioned in the vehicle, a plurality of physical error microphones comprising a first dash microphone, a second dash microphone, a left door microphone, a right door microphone, a driver headrest left microphone, a driver headrest right microphone, a passenger headrest left microphone, and a passenger headrest right microphone positioned in the vehicle, a plurality of virtual error microphones comprising a driver left virtual microphone, a driver right virtual microphone, a passenger left virtual microphone, and a passenger right virtual microphone positioned in the vehicle, and a sensor detecting a head position of the one or more occupants of the vehicle, a stored database of head-related impulse responses, and a controller in electronic communication with the sensor, the stored database, the plurality of speakers, the plurality of physical error microphones, and the plurality of virtual error microphones, the controller programmed to execute a method, comprising: generating a noise cancellation signal using head-related impulse response filtering, and in response to detecting a first position of the one or more occupants: going to the stored database of the head-related impulse responses, selecting only a first subset of transfer functions comprising the head-related impulse response filtering, and updating only the first subset based on the first position, and in response to detecting a second position of the one or more occupants, going to the stored database of head-related impulse responses, selecting only a second subset of transfer functions comprising the head-related impulse response filtering, and updating only the second subset based on the second position, wherein only the first subset is different from only the second subset. In a first example of the method, the method further comprises reducing high frequency noise in response to detected movement of the one or more of occupants, and maintaining the transfer functions corresponding to the right door speaker, the left door speaker, the rear speaker, the right door microphone, and the left door microphone. In a second example of the method, optionally including the first example, the detected movement comprises one or more of a movement direction and a movement distance. In a third example of the method, optionally including one or both of the first and second examples, the detected movement comprises one or more of left and right movement, up and down movement, and forward and backward movement. In a fourth example of the method, optionally including one or more or each of the first through third examples, only the first subset is less than a total set of head-related impulse responses comprising the head-related impulse response filtering and only the second subset is less than the total set of head-related impulse responses comprising the head-related impulse response filtering. In a fifth example of the method, optionally including one or more or each of the first through fourth examples, the first position is a detected movement of a driver and the second position is detected movement of a passenger.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the HF-ANC system 102, driver 160, and/or passenger 162 described with reference to FIG. 1. The methods may be performed by executing stored instructions with one or more logic devices (e.g., processors) in combination with one or more additional hardware elements, such as storage devices, memory, hardware network interfaces/antennas, switches, actuators, clock circuits, etc. The described methods and associated actions may also be performed in various orders in addition to the order described in this application, in parallel, and/or simultaneously. An individual step may be omitted in a particular embodiment. The described systems are exemplary in nature, and may include additional elements and/or omit elements. The subject matter of the present disclosure includes all novel and non-obvious combinations and sub-combinations of the various systems and configurations, and other features, functions, and/or properties disclosed. As used herein, "approximately" is construed to mean plus or minus five percent of the range unless otherwise specified.

As used in this application, an element or step recited in the singular and preceded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. A noise cancellation system, comprising:

a vehicle having a plurality of speakers and a plurality of microphones;

a plurality of sensors; and a controller with computer readable instructions stored on non-transitory memory that when executed cause the controller to:

generate a noise cancellation signal using a set of head-related impulse responses for the plurality of speakers and the plurality of microphones based on a head position of one or more occupants and a plurality of transfer functions, including to selectively update only a subset of the plurality of transfer functions responsive to the plurality of sensors detecting head movement greater than a threshold, while maintaining the rest of the plurality of transfer functions static.

2. The noise cancellation system of claim 1, wherein only the subset is substantially less than a total set of head-related impulse responses for the plurality of speakers and the plurality of microphones.

3. The noise cancellation system of claim 1, wherein the plurality of speakers comprises a first speaker set and a second speaker set, the first speaker set different from the second speaker set, the first speaker set and the second speaker set are less than the plurality of speakers, and the controller further includes computer readable instructions that when executed cause the controller to:

under a condition comprising a first head movement, update only a first subset of the plurality of transfer functions for the first speaker set based on the first head movement; and under a second condition comprising a second head movement, update only a second, different, subset of the plurality of transfer functions for the second speaker set based on the second head movement.

4. The noise cancellation system of claim 1, wherein the plurality of speakers comprises a first speaker, a second speaker, and a third speaker, and a fourth speaker, and the plurality of microphones comprises a first microphone, a second microphone, a third microphone, and a fourth microphone and the controller further includes computer readable instructions that when executed cause the controller to:

under a first condition comprising a first head movement, update only a first subset of the plurality of transfer functions for the first speaker to the first microphone, the first speaker to the second microphone, and the first microphone to the second microphone based on the first head movement; and under a second condition comprising a second head movement, update only a second, different, subset of the plurality of transfer functions for the second speaker to the first microphone, the second speaker to the second microphone, and the first microphone to the second microphone based on the second head movement.

5. The noise cancellation system of claim 1, wherein the controller further includes computer readable instructions that when executed cause the controller to:

under a first condition comprising left and right movement, update only a first subset of transfer functions; and under a second condition comprising forward and backward movement, update only a second subset of transfer functions; and under a third condition comprising up and down movement, update only a third subset of transfer functions;

wherein only the first subset, only the second subset and only the third subset are each less than a total set of transfer functions representing the head-related impulse responses for the plurality of speakers and the plurality of microphones.

6. The noise cancellation system of claim 1, wherein the plurality of speakers comprises a plurality of headrest speakers, a plurality of door speakers, and a rear speaker, and the plurality of microphones comprises a plurality of virtual error microphones and a plurality of physical error microphones.

7. The noise cancellation system of claim 1, wherein only the subset comprises a first set of transfer functions from a plurality of headrest speakers to a plurality of headrest physical error microphones, a second set from the plurality of headrest speakers to a plurality of virtual error microphones, and a third set from the plurality of headrest physical error microphones to the plurality of virtual error microphones.

8. The noise cancellation system of claim 7, wherein the third set comprises a driver subset and a passenger subset, the passenger subset comprising headrest physical error microphones and virtual error microphones not included in the driver subset, and the driver subset comprising headrest physical error microphones and virtual error microphones not included in the passenger subset, and the controller further includes computer readable instructions that when executed cause the controller to:

under a first condition comprising the head movement of a driver, update the driver subset of the third set; and under a second condition comprising the head movement of a passenger, update the passenger subset of the third set.

9. A method for a vehicle, the method comprising:

generating a noise cancellation signal using a set of head-related impulse responses for a plurality of speakers and a plurality of microphones based on a head position of one or more occupants, and selectively changing only a subset of transfer functions applied with the set of head-related impulse responses in response to the head position, while maintaining other transfer functions applied with the set of head-related impulse responses static.

10. The method of claim 9, further comprising reducing high frequency noise in response to detected movement of one or more of occupants, and maintaining the rest of the head-related impulse responses.

11. The method of claim 9, wherein only the subset is substantially less than a total set of head-related impulse responses for the plurality of speakers and the plurality of microphones.

12. The method of claim 9, wherein selectively changing comprises detecting the head position from a sensor, selecting a subset of transfer functions based on the head position, retrieving the transfer functions from memory, and processing the noise cancellation signal with the subset.

13. The method of claim 9, wherein the plurality of speakers comprises a plurality of headrest speakers, a plurality of door speakers, and a rear speaker, the plurality of microphones comprises a plurality of virtual error microphones, a plurality of physical error microphones.

14. The method of claim 9, wherein only the subset comprises a first set of transfer functions from a plurality of headrest speakers to a plurality of headrest physical error microphones, a second set from the plurality of headrest speakers to a plurality of virtual error microphones, and a third set from the plurality of headrest physical error microphones to the plurality of virtual error microphones.

15. A system comprising:

a vehicle;

one or more occupants positioned in the vehicle;

a plurality of speakers comprising a left door speaker, a right door speaker, a driver headrest left speaker, a driver headrest right speaker, a passenger headrest left speaker, a passenger headrest right speaker, and a rear speaker positioned in the vehicle;

a plurality of physical error microphones comprising a first dash microphone, a second dash microphone, a left door microphone, a right door microphone, a driver headrest left microphone, a driver headrest right microphone, a passenger headrest left microphone, and a passenger headrest right microphone positioned in the vehicle;

a plurality of virtual error microphones comprising a driver left virtual microphone, a driver right virtual microphone, a passenger left virtual microphone, and a passenger right virtual microphone positioned in the vehicle; and a sensor detecting a head position of the one or more occupants of the vehicle;

a stored database of head-related impulse responses; and a controller in electronic communication with the sensor, the stored database, the plurality of speakers, the plurality of physical error microphones, and the plurality of virtual error microphones, the controller programmed to execute a method, comprising:

generating a noise cancellation signal using head-related impulse response filtering; and in response to detecting a first position of the one or more occupants:

going to the stored database of the head-related impulse responses;

selecting only a first subset of transfer functions comprising the head-related impulse response filtering; and updating only the first subset based on the first position; and in response to detecting a second position of the one or more occupants;

going to the stored database of head-related impulse responses;

selecting only a second subset of transfer functions comprising the head-related impulse response filtering; and updating only the second subset based on the second position, wherein only the first subset is different from only the second subset.

16. The system of claim 15, further comprising reducing high frequency noise in response to detected movement of the one or more of occupants, and maintaining the transfer functions corresponding to the right door speaker, the left door speaker, the rear speaker, the right door microphone, and the left door microphone.

17. The system of claim 16, wherein the detected movement comprises one or more of a movement direction and a movement distance.

18. The system of claim 16, wherein the detected movement comprises one or more of left and right movement, up and down movement, and forward and backward movement.

19. The system of claim 15, wherein only the first subset is less than a total set of head-related impulse responses comprising the head-related impulse response filtering and only the second subset is less than the total set of head-related impulse responses comprising the head-related impulse response filtering.

20. The system of claim 15, wherein the first position is a detected movement of a driver and the second position is detected movement of a passenger.

* * * * *